US012381508B2

(12) United States Patent
Zimmermann

(10) Patent No.: US 12,381,508 B2
(45) Date of Patent: Aug. 5, 2025

(54) FLOATING CARRIER DEVICE

(71) Applicant: Robert Zimmermann, Eberhardzell (DE)

(72) Inventor: Robert Zimmermann, Eberhardzell (DE)

(73) Assignee: Robert Zimmermann, Eberhardzell (DE)

( * ) Notice: Subject to any disclaimer, the term of this patent is extended or adjusted under 35 U.S.C. 154(b) by 926 days.

(21) Appl. No.: 17/609,354

(22) PCT Filed: May 7, 2020

(86) PCT No.: PCT/EP2020/062752
§ 371 (c)(1),
(2) Date: Nov. 5, 2021

(87) PCT Pub. No.: WO2020/225382
PCT Pub. Date: Nov. 12, 2020

(65) Prior Publication Data
US 2022/0224279 A1    Jul. 14, 2022

(30) Foreign Application Priority Data

May 7, 2019    (DE) ..................... 10 2019 111 888.3

(51) Int. Cl.
*H02S 10/40*    (2014.01)
*B63B 1/12*    (2006.01)
(Continued)

(52) U.S. Cl.
CPC .............. *H02S 10/40* (2014.12); *B63B 1/121* (2013.01); *B63B 5/24* (2013.01); *B63B 35/44* (2013.01);
(Continued)

(58) Field of Classification Search
CPC ........... H02S 10/40; B63B 1/121; B63B 5/24; B63B 35/44
See application file for complete search history.

(56) References Cited

U.S. PATENT DOCUMENTS 3,811,141 A    5/1974 Stoeberl
11,916,510 B1*    2/2024 Raiford .................. B63B 35/44
(Continued)

FOREIGN PATENT DOCUMENTS

CN    204947980 U    1/2016
CN    105857535 A    8/2016
(Continued)

OTHER PUBLICATIONS

First Australian Examination Report for Australian Patent Application No. 2020269935 dated Jul. 26, 2023, 4 pages.
(Continued)

*Primary Examiner* — S. Joseph Morano
*Assistant Examiner* — Jovon E Hayes
(74) *Attorney, Agent, or Firm* — Womble Bond Dickinson (US) LLP

(57) ABSTRACT

A floating carrier device is configured to support at least one solar element floating on a water body, in particular an inland water body, with at least one floating body and with a carrier structure which is coupled with the floating body and is configured to transfer a support force of the at least one solar element to the at least one floating body.

32 Claims, 14 Drawing Sheets

Figure 1B:
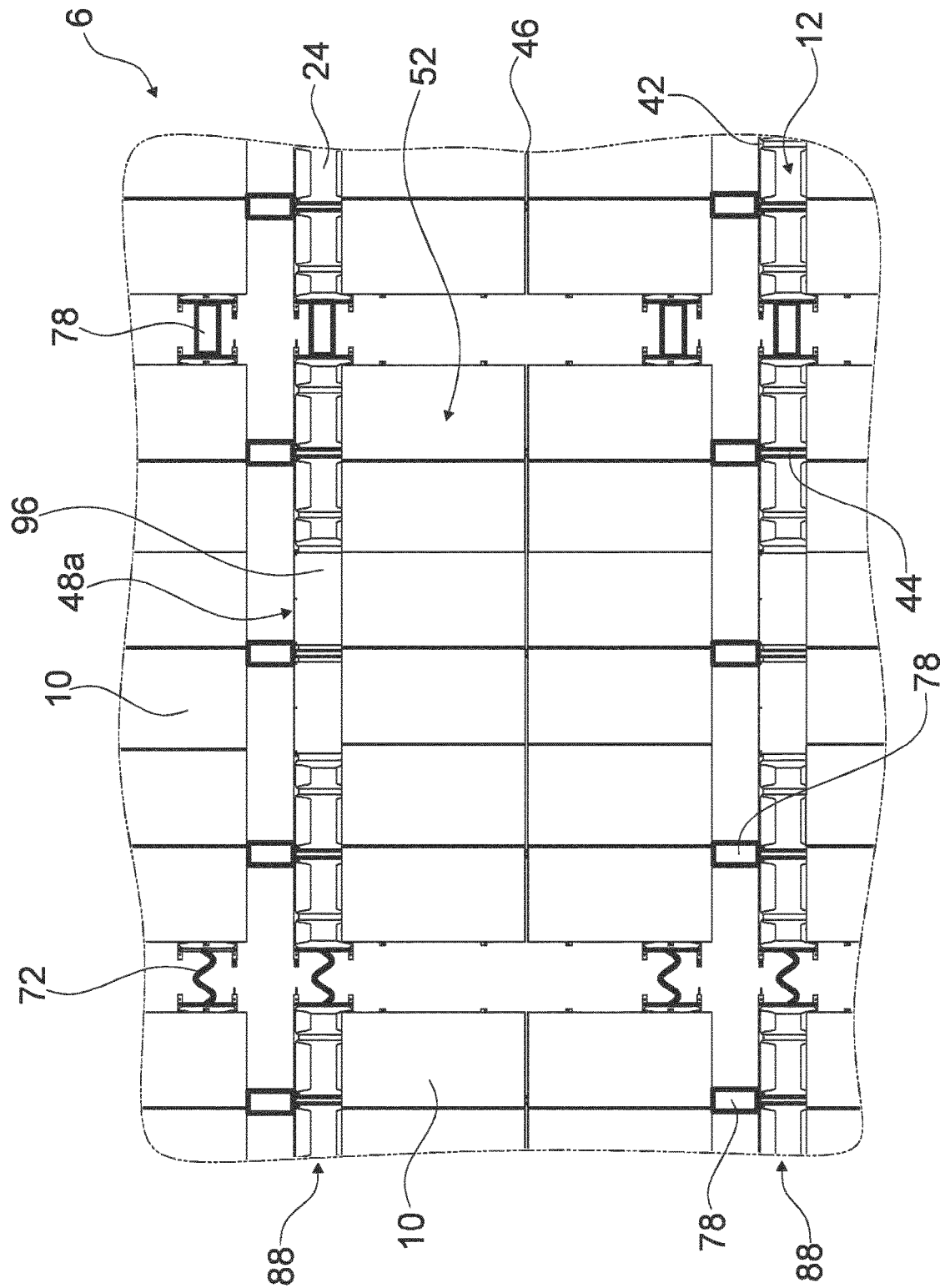

(51) Int. Cl.
*B63B 5/24* (2006.01)
*B63B 35/44* (2006.01)

(52) U.S. Cl.
CPC ... *B63B 2001/123* (2013.01); *B63B 2005/245* (2013.01); *B63B 2035/4453* (2013.01)

(56) References Cited

U.S. PATENT DOCUMENTS

| | | | | |
|---|---|---|---|---|
| 2015/0162866 | A1 | 6/2015 | Yun et al. | |
| 2016/0006391 | A1* | 1/2016 | Kokotov | F24S 25/50 29/832 |
| 2016/0087573 | A1* | 3/2016 | Yang | B63B 3/02 136/251 |
| 2016/0156304 | A1* | 6/2016 | Smadja | B63B 35/44 136/251 |
| 2016/0368577 | A1* | 12/2016 | Gaveau | F24S 25/11 |
| 2017/0085214 | A1* | 3/2017 | Niimi | B63B 35/44 |
| 2017/0324373 | A1* | 11/2017 | Shanfelt | H02S 40/44 |
| 2017/0349245 | A1* | 12/2017 | Yamashita | B63B 35/38 |
| 2018/0001975 | A1* | 1/2018 | Jaramillo | H02S 20/30 |
| 2018/0119994 | A1* | 5/2018 | Helming | F24S 20/70 |
| 2020/0216149 | A1* | 7/2020 | Gaveau | B63B 75/00 |
| 2020/0343850 | A1* | 10/2020 | Yang | B63B 35/44 |
| 2021/0058022 | A1* | 2/2021 | Forrest | B63B 35/44 |
| 2021/0179239 | A1* | 6/2021 | Lee | B63B 35/44 |
| 2021/0214056 | A1* | 7/2021 | Harrison | H02S 10/40 |
| 2022/0024542 | A1* | 1/2022 | Sakaguchi | A01K 45/00 |
| 2022/0190780 | A1* | 6/2022 | Jun | H02S 20/00 |
| 2022/0411026 | A1* | 12/2022 | Chellakat | B63B 35/44 |
| 2023/0179139 | A1* | 6/2023 | Lee | H02S 30/00 136/244 |
| 2023/0182872 | A1* | 6/2023 | Prouvost | B63B 1/125 114/264 |
| 2023/0412114 | A1* | 12/2023 | Mayer | B63B 79/10 |
| 2024/0048089 | A1* | 2/2024 | Gavish | H02S 20/00 |
| 2024/0190542 | A1* | 6/2024 | Cardon | H02S 20/00 |
| 2024/0253748 | A1* | 8/2024 | Menard | H02S 20/30 |

FOREIGN PATENT DOCUMENTS

| | | | | |
|---|---|---|---|---|
| CN | 106452299 | B | 9/2017 | |
| CN | 106411233 | B | 1/2019 | |
| CN | 117833795 | A * | 4/2024 | ............ B63B 35/44 |
| DE | 102011009424 | A1 | 6/2012 | |
| DE | 102012100759 | A1 | 8/2013 | |
| EP | 2549551 | A1 | 1/2013 | |
| JP | 2007109769 | A | 4/2007 | |
| KR | 1020140036092 | A | 3/2014 | |
| KR | 20140036092 | A * | 10/2014 | ............ B63B 35/38 |
| KR | 101501466 | B1 | 3/2015 | |
| KR | 20210087259 | A * | 8/2021 | ............ H02S 10/20 |
| WO | 2012076007 | A1 | 6/2012 | |
| WO | WO-2021162225 | A1 * | 8/2021 | |

OTHER PUBLICATIONS

Korean Office Action received in related Korean Application No. 10-2021-7035337, mailed Jan. 20, 2024, 14 pages.
Office Action received in related Chinese Application No. 202080044656.7, mailed Oct. 11, 2024, 14 pages.
German Office Action and Search Report on the Patentability of Application No. 10 2019 111 888.3, Mailed Mar. 6, 2020, 9 pages.
International Preliminary Report and written Opinion on the Patentability of Application No. PCT/EP2020/062752, Mailed Nov. 2, 2021, 12 pages.
Office Action received in related Chinese Application No. 202080044656.7, mailed Mar. 29, 2024, 18 pages.
Israeli Office Action received in related Israeli Application No. 287429, mailed Mar. 14, 2024, 5 pages.
European Office Action received in related European Application No. 20727162.8, mailed Apr. 4, 2024, 8 pages.
Office Action received in related European Application No. 20727162.8, mailed Dec. 23, 2024, 9 pages.

* cited by examiner

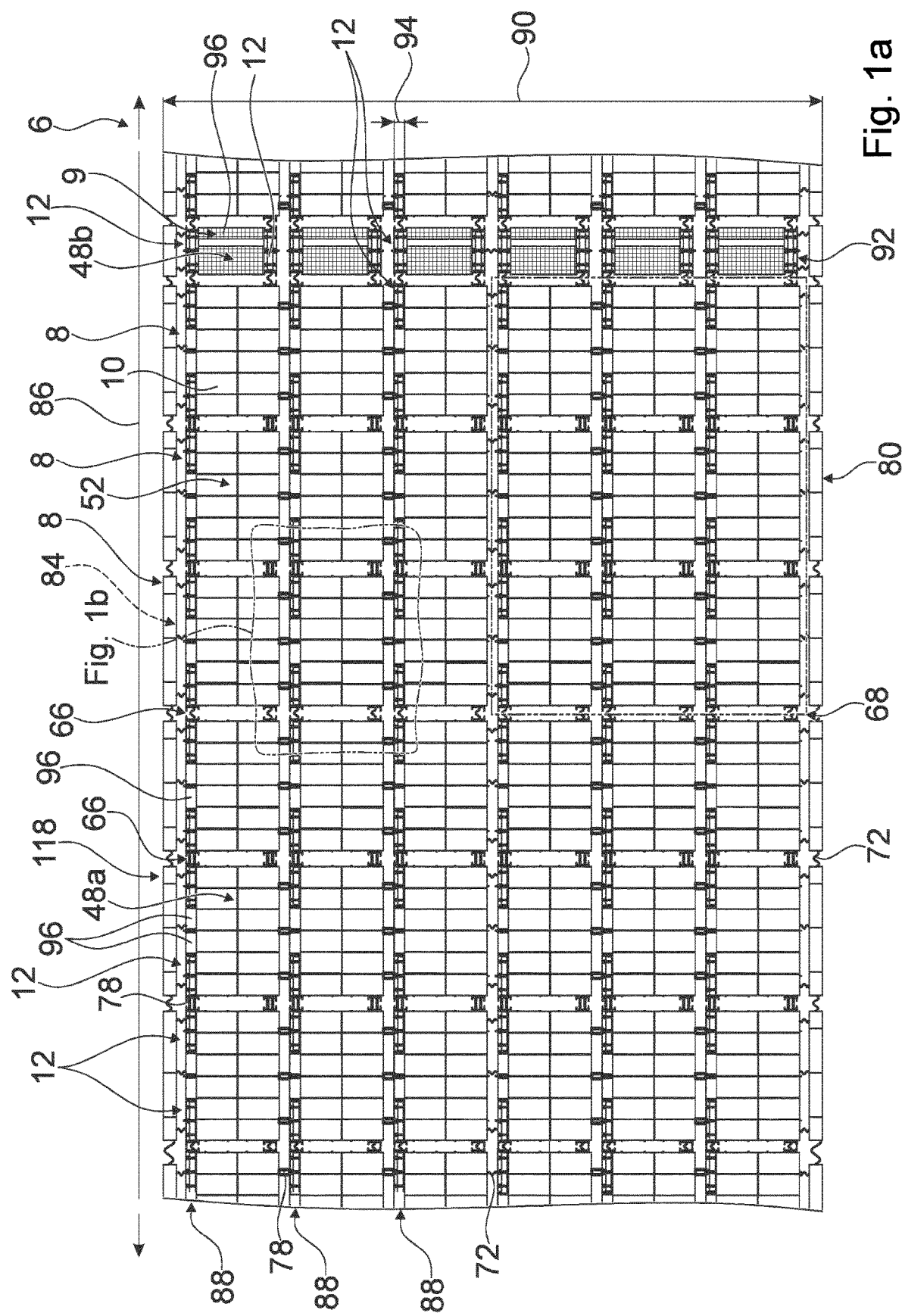

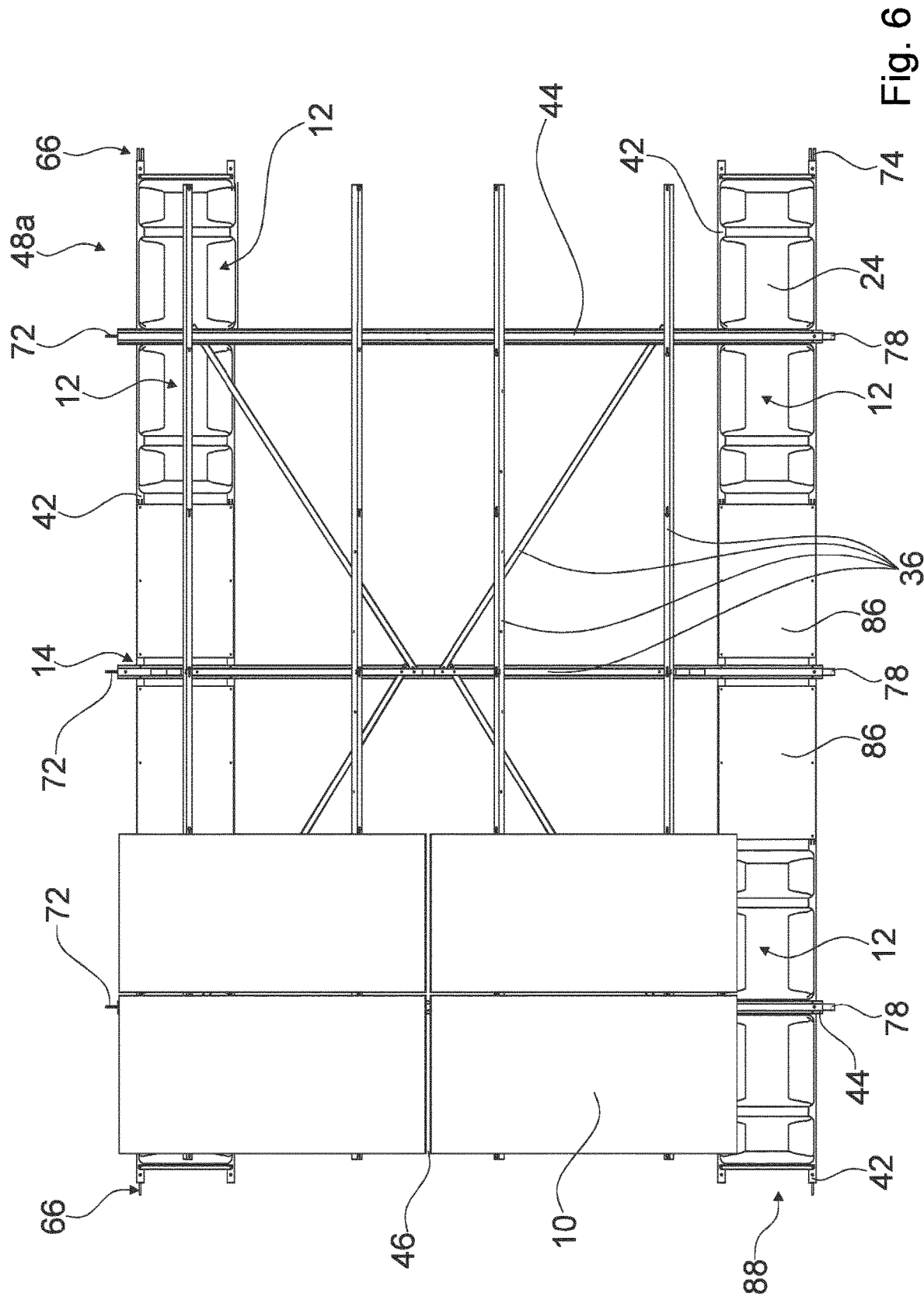

US 12,381,508 B2

FLOATING CARRIER DEVICE

RELATED APPLICATIONS

The present application is the national phase of International Application No. PCT/EP2020/062752, filed on May 7, 2020 which claims priority to and the benefit of German Patent Application No. 10 2019 111 888.3, filed on May 7, 2019, and the disclosures of which are hereby incorporated herein by reference in their entireties.

ADVANTAGES OF THE INVENTION

A floating carrier device is proposed that is configured to support at least one solar element floating on a water body, in particular an inland water body, with at least one floating body and with a carrier structure which is coupled with the floating body and is configured to transfer a support force of the at least one solar element to the at least one floating body.

By a "floating body" is herein in particular a body to be understood that generates a buoyancy force. In particular, by a floating body is a hollow body to be understood with one hollow space or a plurality of hollow spaces, preferably with one single contiguous hollow space.

The carrier structure is preferentially configured to transfer away support forces, in particular to a floating body. Preferably the carrier structure is embodied at least largely of metal. Particularly preferably the carrier structure is embodied at least largely of steel. The phrasing "at least largely" or "at least to a large extent" is here in particular to mean by at least 55%, advantageously at least 65%, preferentially at least 75%, particularly preferably at least 85% and especially advantageously at least 95%.

By an implementation according to the invention it is possible to achieve a solar device which is particularly flexibly implementable. Furthermore an implementation according to the invention provides an easy assembly with favorable production costs and with a compact construction.

It is further proposed that the floating body comprises on at least one side wall a receiving region for the carrier structure, as a result of which the support forces are particularly advantageously introducible.

A "side wall" is preferably a wall of the floating body whose envelope section faces toward a reference side face of a smallest imaginary reference rectangular cuboid, the reference rectangular cuboid just still completely enclosing the floating body.

An "envelope" is preferably an, in particular geometrically smallest, preferably free geometry enveloping a body, the geometry being in particular free of inflection points.

The, in particular smallest imaginary, reference rectangular cuboid preferentially comprises, preferably in an assembled operation state of the floating body, a reference upper side and a reference underside. The reference upper side and the reference underside are in particular arranged at least substantially parallel to a preferably ideal water surface. The reference rectangular cuboid comprises reference side faces. In particular, preferably in an assembled operation state, the reference side faces are arranged perpendicularly to the ideal water surface. "Facing toward" is in particular to mean, in this context, that a surface faces towards a reference surface if a surface normal of the surface, in particular of an envelope section of the floating body, comprises relative to a reference surface normal of the reference surface, in particular of a reference rectangular cuboid, a parallel component having an absolute value that is greater than/equal to 50% of the absolute value of the surface normal. In particular, the side wall is configured to connect an upper side and an underside of the floating body to each other.

The ideal water surface preferably extends in a horizontal plane and is in particular free of waves and flows and other perturbations. Preferentially an earth curvature is neglected in particular for an illustration of the ideal water surface.

The term "substantially perpendicularly" is here in particular intended to define an orientation of a direction relative to a reference direction wherein, in particular viewed in a plane, the direction and the reference direction include an angle of 90 degrees. and the angle has a maximum deviation that is in particular smaller than 8 degrees, advantageously smaller than 5 degrees and especially advantageously smaller than 2 degrees. Furthermore a "main extension plane" is preferably to be understood as a plane of a body, in particular of a floating body, that extends parallel to a largest side face of a smallest imaginary reference rectangular cuboid just still completely enclosing the body, in particular the floating body, said plane in particular extending through the center point of the reference rectangular cuboid. In particular, in an assembled operation state the main extension plane extends at least substantially perpendicularly to the ideal water surface.

By a "receiving region" is in particular a region to be understood that forms a support surface for a support of support forces. The receiving region in particular comprises a receiving contour. Preferably the support surface is formed by the receiving contour. The receiving contour is preferentially configured for a delimitation of the receiving region. By a receiving region being arranged on at least one side wall of the floating body is in particular to be understood that in a region of the side wall a receiving region is arranged, which is preferably embodied as an elevation and/or deepening. Particularly preferably the receiving region is embodied as a deepening in a region of the side wall. Beyond this it would be conceivable that the receiving contour, in particular the receiving region, may preferably be implemented in an L-shape and/or U-shape and/or T-shape and/or C-shape and/or Omega-shape and/or V-shape and/or O-shape and/or as a combined shape or as a multiple combination.

Furthermore it is proposed that the floating body comprises a receiving region for the carrier structure at least on an upper side, thus allowing an especially advantageous introduction of the support forces Preferentially an upper side of the floating body is a wall of the floating body whose envelope section faces towards the reference upper side of the, in particular smallest, imaginary rectangular cuboid enclosing the floating body, which preferably just still completely encloses the floating body. Furthermore an underside is a wall of the floating body whose envelope section faces towards the reference underside of the, in particular smallest, imaginary rectangular cuboid enclosing the floating body. The upper side is preferably arranged above the water surface, in particular in a space. Especially preferentially the upper side of the floating body has in an assembled operation state a distance to the, in particular ideal, water surface. It is moreover proposed that the floating body comprises the receiving region for the carrier structure at least on the side wall and/or on the upper side.

It is also proposed that the receiving region is implemented integrally with the floating body, resulting in a particularly advantageous reduction of production costs and/or assembly costs being achievable. "Integrally" is in particular to mean at least connected by substance-to-substance bond, for example by a welding process, a gluing process, an injection-molding process and/or any other process that is deemed expedient by someone skilled in the art, and/or advantageously formed in one piece, for example by a production from a cast and/or by a blow procedure, in particular an extrusion blow procedure, and/or by a production in a one-component or multi-component injection-molding procedure, and/or especially advantageously from a single blank. The receiving region is in particular integrally molded with the floating body. In particular, the receiving region is implemented by an extrusion blow procedure in such a way that it is integrally molded with the floating body.

Furthermore it is proposed that the receiving region is configured for a form-fit accommodation of the carrier structure, as a result of which an advantageously time-efficient and/or non-destructive assembly is achievable at low material costs. The term "form-fit" is in particular to mean that surfaces, which are situated opposite each other in an assembled operation state, exert a holding force onto each other that acts in a normal direction of the surfaces. In particular, the structural components are in a geometrical engagement with each other. In particular, the surfaces are configured to preferably transfer support forces from the form-fit accommodation to the carrier structure. It is preferentially possible for the surfaces to have a spacing between each other in an assembled operation state.

It is moreover proposed that the floating body is produced at least substantially via an extrusion blow procedure, as a result of which an advantageously precise outer surface can be defined and/or structured in one work step and an advantageously cost-efficient production process can be made available.

The floating body is preferably embodied of a thermoplastic material. In particular, the floating body is embodied of a food-safe material. Particularly preferably the floating body is made of an HDPE plastic material. In particular, the extrusion blow procedure is configured for forming the floating body from a flexible-tube-like pre-form. In the extrusion blow procedure preferentially a negative tool, in particular of the floating body, is utilized. In particular, the negative tool has on its inner side structural features of an end product, in particular an intended shape of the floating body.

A hollow-body production by means of a "stretch-blow molding procedure" is also conceivable, as well as any other production method deemed expedient by someone skilled in the art.

Beyond this it is proposed that the floating body comprises at least two stack elements, which are implemented and/or arranged correlating with each other and which are configured to bring at least two floating bodies to a laterally form-fit engagement with each other. This allows achieving an advantageous space efficiency and/or transport efficiency. It is thus particularly advantageously possible to achieve a reduction of logistics costs.

"Implemented correlating with each other" is in particular to mean, in this context, that at least one first element, in particular stack element, and at least one further element, in particular stack element, are configured to be brought to an engagement with each other. Furthermore, in particular two elements, in particular stack elements, which are preferably implemented correlating with each other, are preferably embodied in a form-fit manner for a lateral force transfer. A lateral force transfer is preferentially effected in a direction that is at least substantially perpendicular to an earth acceleration. In particular, a smallest cross section measurement of the at least one first element, in particular stack element, is larger than a largest cross section measurement of the at least one further element, in particular stack element, that is embodied correlating with the at least one first element. Especially preferentially the stack elements are implemented such that they are correlating with each other, in particular geometrically. Moreover, preferably an inner contour of a first element, in particular stack element, is implemented in such a way that it is structurally identical and reduced in size relative to an outer contour of a further element, which is in particular implemented correlating thereto. The inner contour is preferably implemented as an enlargement of the outer contour. Preferably the outer contour, in particular the outer contour of the at least one first element, is configured to receive the inner contour, in particular the inner contour of the at least one further element.

The stack elements are preferably configured to prevent a slippage and/or sliding off of a floating body, in particular of a floating body that is arranged above a further floating body. A lateral form-fit is preferably configured for a delimitation of a horizontal movement, in particular at least substantially perpendicularly to the earth acceleration. Preferentially at least two floating bodies are configured to be stacked onto each other in a stacking direction on a stack axis. The stack elements are preferably configured to delimit, in particular in a form-fit manner, a movement perpendicularly to the stacking direction.

In particular, at least one first stack element is arranged on the underside of the floating body. Furthermore, in particular at least one further stack element is arranged on the upper side of the floating body. Preferably the at least one first stack element is arranged in a manner correlating with the at least one further stack element. In particular, the at least one first stack element and the at least one further stack element are preferably arranged on the floating body such that in particular at least two, preferably structurally identical floating bodies, which are in particular brought to an engagement with each other by means of stack elements, comprise reference side faces of the reference rectangular cuboid which are arranged at least substantially without offset and parallel. In particular, main extension planes of at least two floating bodies that are stacked together preferably lie in a shared plane, preferably at least substantially without offset. "At least substantially without offset" is in particular to mean, in this context, a lateral deviation, preferably perpendicularly to a stacking direction, that is in particular smaller than 20 mm, preferentially smaller than 15 mm, preferably smaller than 10 mm and particularly preferably smaller than 5 mm, as well as an angle deviation that is in particular smaller than 10 degrees, preferentially smaller than 8 degrees, preferably smaller than 5 degrees and particularly preferably smaller than 3 degrees. Preferentially the two stack elements which are implemented correlating with each other are arranged on an upper side and an underside of the floating body, preferably in a manner correlating with each other. In particular, the two stack elements which are preferably arranged correlating with each other comprise surfaces which are in particular implemented geometrically correlating with each other. Preferably the stack elements which are implemented correlating with each other, in particular on a floating body, are arranged at least substantially parallel to each other. The stack elements are furthermore preferably implemented integrally with the floating body. Further the stack elements in particular have a rect-angle shape and/or spheric shape and/or conic shape and/or elliptic shape and/or parabolic shape and/or wave shape and/or saw-tooth shape and/or pyramidal shape and/or furrowed shape and/or a combination at least of the above-mentioned shapes. Particularly preferably the stack elements are embodied on a surface of the floating body as a macroscopic structure. By a "macroscopic structure" is here in particular an implementation to be understood that forms an elevation and/or deepening that goes beyond a plane spanned by a surface, that in particular goes beyond a mere and/or increased roughness of a material. In this context the macroscopic structure preferentially comprises an elevation and/or deepening perpendicularly to the plane of the spanned surface by in particular more than 1 mm, preferably more than 3 mm, preferentially more than 5 mm and particularly preferably more than 10 mm. The macroscopic structure further comprises, in this context, preferably an elevation or deepening perpendicularly to the plane of the spanned surface by in particular less than 65 mm, preferentially less than 55 mm, preferably less than 45 mm and particularly preferably less than 35 mm.

It is further proposed that at least one of the stack elements is implemented as a deepening and at least one further stack element of the stack elements is implemented as an elevation that is realized correlating with the deepening. In this way an advantageously high level of efficiency of the stackability of the floating bodies is achievable in an advantageously simple manner, at high cost-efficiency and low production effort. Preferably, perpendicularly to the spanned plane of the surface, preferentially in a parallel and/or in an anti-parallel direction of a surface normal of the reference upper side and/or of the reference underside, the elevation and/or the deepening are/is greater than 4 mm, preferably greater than 15 mm and very particularly preferably greater than 200 mm.

Moreover it is proposed that the floating body is implemented at least partly with an anti-skid implementation. An outer surface of the floating body preferably has, relative to a smooth surface of a floating body material, an increased friction, in particular static friction and/or kinetic friction. Furthermore, at least one outer surface of the floating body at least partly comprises an increased anti-skid implementation regarding a slide-enhancing substance, in particular water. In particular, the anti-skid implementation is embodied integrally with the floating body. Preferably the anti-skid implementation is embodied as an anti-skid covering. In particular, the anti-skid implementation is embodied as a mat, in particular a rubber mat, and/or as a textured structure and/or as a foil and/or as a granulate and/or as a foam. Especially preferably the anti-skid implementation is embodied as a macroscopic structure. Preferably, the macroscopic structure has, in this context, an elevation and/or deepening perpendicularly to the plane of the spanned surface by in particular more than 0.3 mm, preferentially more than 0.8 mm, preferably more than 1 mm and particularly preferably more than 1.5 mm. Preferably the macroscopic structure furthermore has, in this context, an elevation and/or deepening perpendicularly to the plane of the spanned surface by in particular less than 35 mm, preferably less than 20 mm, preferentially less than 10 mm and particularly preferably less than 5 mm. The macroscopic structure, in particular macroscopic anti-skid structure, is in particular implemented as a planar arrangement of elevations and/or deepenings. Preferably the macroscopic structure is in particular realized as a lattice structure and/or nub structure and/or furrowed structure and/or serrated structure and/or cross-wise structure and/or textured structure and/or fiber structure and/or pyramidal structure and/or circular structure and/or honeycomb structure and/or triangle structure and/or of structures which are at least partially superimposed with each other.

Advantageously by way of an anti-skid implementation a slippage risk is reduced and an operational safety is augmented. Furthermore, an implementation is conceivable of the, in particular anti-skid, macroscopic structure as at least one stack element.

Furthermore it is proposed that in an assembled operation state the floating body at least partly has a decreasing maximum transverse extension perpendicularly to the ideal water surface, along a direction from the upper side to the underside of the floating body.

In particular, the floating body has a decreasing maximum transverse extension in a direction of a surface normal of the reference underside of the floating body. In an assembled operation state the floating body is preferably arranged at least partly above a water surface. In an assembled operation state the floating body is preferentially arranged below the ideal water surface, in particular over more than 20%, preferably over more than 40% and particularly preferably over more than 50% of the maximum extension of the floating body along the vertical axis.

In particular, in an assembled operation state the floating body is accommodated in the carrier structure of the floating carrier device, which is in particular arranged floating on and/or in a water body having a water surface. By a "vertical axis" is in particular, in this context, an axis to be understood which in particular extends perpendicularly to a water surface. In particular, a vertical axis extends along the direction of the surface normal of the reference upper side and/or of the reference underside, preferably of the smallest imaginary rectangular cuboid of the floating body. Preferentially the upper side of the floating body is implemented in particular in a curved manner, preferably at least partly in a convexly and/or concavely curved manner. It is further conceivable that the upper side of the floating body is at least largely embodied in a planar fashion. Preferentially the underside of the floating body is embodied in a curved manner, preferably at least partly in a convexly and/or concavely curved manner. Moreover it is conceivable that the underside of the floating body may be embodied in a planar fashion, at least to a large extent. Preferentially the, in particular entire, decreasing maximum transverse extension has a value, in particular a difference value between a maximum transverse extension and a minimum transverse extension, namely in particular a transverse extension of the underside of the floating body, perpendicularly to the vertical axis, that is preferably greater than 5 cm, preferentially greater than 10 cm and particularly preferably greater than 15 cm. Furthermore the, in particular entire, decreasing maximum transverse extension preferably has a value, in particular a difference value between a maximum transverse extension and a minimum transverse extension, namely in particular a transverse extension of the underside of the floating body, perpendicularly to the vertical axis, that is preferentially smaller than 45 cm, preferably smaller than 35 cm and particularly preferably smaller than 25 cm. Preferentially the underside of the floating body has the smallest transverse extension. Preferably the transverse extension decreases over at least a substantial portion of a maximum extension of the floating body along the vertical axis, in particular towards the underside of the floating body, i.e. in particular over more than 20%, preferentially over more than 40% and especially preferentially over more than 50% of the maximum extension of the floating body along the vertical axis.

An at least partially decreasing maximum transverse extension of the floating body along a vertical axis, in particular from the upper side of the floating body and/or from the water surface to the underside of the floating body, may contribute to a particularly advantageous flexible applicability of the floating body and/or of the floating carrier device. It is advantageously possible to utilize the floating body and/or the floating carrier device in freeze-risk water bodies. Especially advantageously a robustness is enhanced with respect to external conditions, in particular with respect to an ice pressure. Due to an implementation of the floating body according to the invention, an ice pressure will push at least the floating body out of a water body that is freezing over, and the ice pressure will thus be avoided. Advantageously an ice pressure is avoided and a lifetime as well as usability and efficiency are augmented.

Beyond this it is proposed that at least two side walls of the floating body are embodied at least partially as slant surfaces. Moreover it is possible for the underside of the floating body to be implemented as a slant surface. Preferably the slant surfaces are implemented at least partly in a curved manner. It is also conceivable that the slant surfaces are implemented at least partly in a planar fashion. Particularly preferably a main extension plane of a smallest imaginary rectangular cuboid which encloses the at least one side wall of the floating body includes an angle with a slant surface, in particular relative to the reference underside and/or the reference upper side of the floating body, that is in particular smaller than 88 degrees, preferably smaller than 85 degrees, preferably smaller than 82 degrees and especially preferentially smaller than 80 degrees. In particular, a main extension plane of a smallest imaginary rectangular cuboid enclosing the at least one side wall of the floating body includes an angle with a slant surface of in particular more than 45 degrees, preferentially more than 55 degrees, preferably more than 65 degrees and particularly preferably more than 70 degrees, in particular relative to the reference underside and/or the reference upper side of the floating body. It is possible for the slant surface, in particular side wall, to be implemented as a planar and/or curved and/or polygonal surface and/or as a combination thereof. Furthermore the slant surface, in particular side wall, could preferably be implemented of any number of sub-surfaces having any angles and/or curvatures relative to one another. In particular, the main extension plane of at least one side wall includes an angle of in particular less than 40 degrees, preferentially less than 30 degrees, preferably less than 20 degrees and especially preferentially less than 15 degrees with the reference side face of the floating body. The main extension plane of at least one side wall preferably includes an angle of in particular more than 1 degree, preferably more than 3 degrees, preferentially more than 4 degrees and particularly preferably more than 5 degrees with the reference side face of the floating body. This allows achieving a particularly advantageously flexible implementation of the invention, which is in particular usable independently from a frost risk. Furthermore in this way an efficiency and a lifetime of the invention are significantly augmentable as a destruction by ice, in particular ice pressure, is advantageously avoidable.

It is further proposed that at least two side walls of the floating body are arranged at least substantially in a wedge shape relative to one another. Preferably the side walls are implemented at least partially curved. The side walls could also be embodied in particular in a planar fashion. In particular, a first main extension plane of a smallest imaginary rectangular cuboid enclosing a first one of the side walls has an angle offset of in particular at least 4 degrees, preferably at least 16 degrees, preferentially at least 30 degrees, advantageously at least 45 degrees and particularly preferably at least 60 degrees relative to a second main extension plane of a smallest imaginary rectangular cuboid enclosing a second one of the side walls.

It is also proposed that at least one side wall of the floating body comprises at least one crimp profile, which is configured to augment a stability of the floating body. The crimp profile is in particular implemented integrally with the floating body. Preferentially the crimp profile is embodied as an elevation and/or deepening. Preferably the crimp profile is embodied as a groove-shaped and/or circle-shaped and/or ellipse-shaped deepening and/or elevation. Especially preferentially the crimp profile is arranged for a reinforcement and/or stiffening of at least one side wall of the floating body. It is in this way possible to save production costs by way of an advantageous shaping. In particular, there is an advantageous reduction of weight and/or of material costs due to shape-giving stiffening and/or design-based stability.

Beyond this it is proposed that the floating body comprises at least on an upper side and/or on an underside at least one crimp profile, which is configured to augment a stability of the floating body. The crimp profile is preferably arranged for a reinforcement and/or stiffening of the upper side and/or of the underside of the floating body. It is in this way possible to save production costs by way of an advantageous shaping. In particular, there is an advantageous reduction of weight and/or of material costs due to shape-giving stiffening and/or design-based stability.

It is furthermore proposed that the floating body comprises at least one closure element with a pressure compensation unit. The closure element is preferably configured for a checking and/or filling and/or emptying of the floating body. The pressure compensation unit is preferably configured to balance an inner pressure of the floating body with an ambient pressure, in particular in a bidirectional manner. Preferentially the pressure compensation unit is embodied as a pressure compensation valve. The pressure compensation unit may also be implemented as a breathable and/or flexible membrane.

Especially preferentially the pressure compensation unit is implemented to be water-impermeable, in particular impermeable for liquid water. This advantageously allows a flexible usage of the invention in a wide range of application areas, in particular with high temperature change rates. In this way a reduction of further tensions and/or forces is advantageously possible. Especially advantageously an efficiency regarding lifetime and production costs is thus increasable.

Furthermore it is proposed that the carrier structure comprises at least one carrier element that is embodied as a cable guiding unit, as a result of which a flexibly implementable installation can be made available. In particular, an advantageously secure and assembly-friendly cable guidance can be made available. Moreover, especially advantageously an assembly effort and/or installation efforts are/is reducible. The cable guiding unit is preferably implemented as a carrier element that is delimited at least on three sides. The cable guiding unit is furthermore in particular embodied as an empty conduit.

Preferentially the cable guiding unit may be implemented as a profiled semi-finished product. The cable guiding unit could also be implemented in particular as a cable guiding unit that is at least substantially closed, in particular along a circumference. The cable guiding unit is preferably implemented as an at least partially open cable guiding unit.

Preferentially the cable guiding unit comprises at least one edge protection element. For an accommodation of cables the cable guiding unit is in particular embodied as a U-profile and/or Z-profile and/or T-profile and/or L-profile and/or C-profile and/or is embodied of any profile combination.

It is also proposed that the carrier structure comprises at least one carrier element that is implemented by a hollow profile, as a result of which it is possible to provide an advantageously lightweight and stable carrier structure. In particular, an advantageously large lie-upon surface can be made available with a low weight. Preferentially the hollow profile is embodied as a tube-shaped rod profile. Preferably the hollow profile is embodied as a semi-finished product. Particularly preferably the hollow profile has a rectangular cross section. A polygonal and/or circular and/or square and/or elliptic and/or undulate cross section and/or a combination thereof are/is also conceivable.

It is also proposed that the carrier element is implemented at least partially open along a longitudinal axis, as a result of which a weight reduction is advantageously achievable. Preferably the carrier element is implemented at least substantially completely open along a longitudinal axis. The term "at least substantially completely" is here in particular to mean at least 55%, advantageously at least 65%, preferentially at least 75%, particularly preferably at least 85% and especially advantageously at least 95%. Preferably the carrier element is implemented to be at least substantially continuously open along a longitudinal axis. Particularly preferably the opening is implemented water-permeable. It is further conceivable that the opening may in particular be embodied as a membrane and/or as a lattice.

Furthermore it is proposed that in an assembled operation state the carrier element comprises at least one opening in a deepest point, which advantageously allows providing a drainage for water. In particular, the carrier element comprises, preferably in an assembled operation state, in a deepest point an opening towards the preferably ideal water surface and/or parallel to a reference surface normal of the reference underside of the floating body. It is also conceivable that in an assembled operation state the carrier element comprises, in particular in a deepest point, an opening in a horizontal direction. In particular, preferably in an assembled operation state, the carrier element comprises an opening that is oriented downwards, in particular in a direction that is parallel to a reference surface normal of the reference underside of the floating body. It is advantageously possible to prevent moisture retention and in particular an accompanying potential corrosive impact on the carrier element.

In an assembled operation state the carrier element is preferably arranged above the water surface. The opening of the carrier element is preferably oriented towards the water surface. Particularly preferably the opening is oriented in the direction of earth acceleration, in particular to allow a water exit out of the carrier element. Preferentially the opening is arranged in a deepest point of the carrier element, in particular towards the preferably ideal water surface. It is moreover conceivable that the opening is oriented at least substantially parallel to the water surface.

It is further proposed that the carrier element is implemented as a C-profile, which allows providing a high-grade production efficiency with low production costs. The C-profile is preferably implemented as a profiled semi-finished product. The C-profile is preferentially implemented as a rectangle profile. Particularly preferably the C-profile is enclosed at least on two sides and in particular comprises at least partially an opening on at least one side.

Beyond this it is proposed that in an assembled operation state, viewed in a direction from an upper side of the carrier element towards a water surface, the carrier element comprises at least one downwards-extending slant surface, as a result of which it is advantageously possible to improve a force flow and/or a force transmission. This advantageously results in an increased lifetime and/or in an advantageously broad flexible applicability of the invention.

The slant surface preferably has an angle offset relative to a surface of the carrier element that is implemented parallel to the, in particular ideal, water surface. In particular, the angle offset preferably has a value that is greater than 1 degree, preferentially greater than 2 degrees or particularly preferably greater than 5 degrees. The angle offset furthermore preferentially has a value that is smaller than 45 degrees, preferably smaller than 30 degrees or particularly preferably smaller than 15 degrees. Moreover the slant surface may in particular be implemented in a curved and/or planar fashion, and/or may be implemented as a combination of a curved and planar surface. Preferentially the slant surface of the carrier element is implemented to be at least partially correlating with the support surface of the floating body, in particular with the receiving contour. In particular, the slant surface of the carrier element, which is implemented correlating with the support surface, has an angle deviation of in particular less than 15 degrees, preferably less than 10 degrees, preferably less than 8 degrees and particularly preferably more than 2 degrees, preferably in a region that is provided for contacting.

It is also proposed that for a form-fit accommodation of the at least one floating body, the carrier structure comprises at least two carrier elements which are implemented as longitudinal carrier elements and at least one carrier element which is implemented as a transverse carrier element, as a result of which a flexible incorporation of the floating body in the installation according to the invention is achievable. Furthermore, especially advantageously an assembly time is reducible. Especially advantageously this allows dispensing with a usage of fixation means entering the floating body. Preferably, in an assembled operation state, the at least one carrier element implemented as a longitudinal carrier element is arranged along a longitudinal side of the floating body. The carrier elements implemented as longitudinal carrier elements are in particular arranged in the receiving regions of the side walls. Preferably the at least one carrier element implemented as a transverse carrier element is arranged on an upper side of the floating body. The at least one carrier element implemented as a transverse carrier element is in particular arranged in the receiving region of the upper side of the floating body. Preferentially the at least one carrier element implemented as a longitudinal carrier element and the at least one carrier element implemented as a transverse carrier element are arranged in such a way that in an assembled operation state, in particular on the water surface, a holding force can be exerted counter to a relative movement of the floating body and of the carrier structure in a horizontal and/or in a vertical direction. Preferably the at least one carrier element implemented as a longitudinal carrier element is in particular configured to exert a holding force counter to a vertical movement of the floating body relative to the carrier structure.

Beyond this it is proposed that the carrier structure is configured to receive at least one floating body such that it is supported floating, which allows an advantageous compensation of an, in particular temperature-induced, expansion and/or contraction of the floating body.

A floating support is preferably configured for receiving a unit and/or an element at least substantially without tension.

In particular, a floating support preferably allows a movement range and/or expansion range of the received unit and/or element.

Preferentially the floating support provides a movement range and/or expansion range along at least one length that is greater than 1 mm, preferably greater than 2 mm and particularly preferably greater than 9 mm. Preferably the floating support furthermore provides a movement range and/or expansion range along at least one length that is smaller than 15 mm, preferentially smaller than 7 mm and especially preferentially smaller than 4 mm. A floating support is in particular configured for receiving and/or supporting a supported unit in at least one direction by way of a clearance fit.

It is thus particularly preferably possible to achieve a high level of flexibility regarding a location of use of the installation according to the invention, in particular a location of use with a great range of temperature fluctuations.

Moreover it is proposed that the carrier structure has a maximum longitudinal extension of at least 4 m, preferably at least 6 m, preferentially at least 8 m and particularly preferably at least 9 m. An advantageously large energy conversion area can be facilitated. An advantageously stable and robust implementation of the floating carrier device is achievable. The maximum longitudinal extension of the carrier structure is preferably oriented at least substantially parallel to the main extension plane of the floating carrier device, in particular of the carrier structure, and/or is oriented, in particular in a floating state of the floating carrier device, at least substantially parallel to the ideal water surface. Preferably, viewed in at least one plane, in particular a plane that is oriented at least substantially parallel to the main extension plane of the floating carrier device, in particular the carrier structure, and/or is oriented, in particular in a floating state of the floating carrier device, at least substantially parallel to the ideal water surface, the floating carrier device, in particular the carrier structure, has an at least substantially rectangular basic shape, wherein in particular the maximum longitudinal extension of the carrier structure extends along a longest side of the basic shape. The maximum longitudinal extension of the carrier structure is in particular maximally 20 m, preferentially no more than 15 m and preferably no more than 10 m. Preferably the maximum longitudinal extension of the carrier structure extends at least to a major extent, in particular at least substantially completely, over a maximum longitudinal extension of the floating carrier device.

It is further proposed that the carrier structure has a maximum transverse extension of at least 3 m, preferably at least 4 m and preferentially at least 4.5 m. An advantageously large energy conversion area can be facilitated. An advantageously stable and robust implementation of the floating carrier device is achievable. Preferably the maximum transverse extension of the carrier structure is oriented at least substantially parallel to the main extension plane of the floating carrier device, in particular the carrier structure, and/or is oriented, in particular in a floating state of the floating carrier device, at least substantially parallel to the ideal water surface. Preferably, viewed in at least one plane, in particular a plane that is oriented at least substantially parallel to the main extension plane of the floating carrier device, in particular the carrier structure, and/or is oriented, in particular in a floating state of the floating carrier device, at least substantially parallel to the ideal water surface, the floating carrier device, in particular the carrier structure, has an at least substantially rectangular basic shape, wherein in particular the maximum transverse extension of the carrier structure extends along a side of the basic shape that is in particular implemented differently from the longest side of the basic shape. The maximum transverse extension of the carrier structure is in particular maximally 20 m, preferably no more than 15 m and preferentially no more than 10 m. The maximum transverse extension of the carrier structure preferably extends at least to a major part, in particular at least substantially completely, over a maximum transverse extension of the floating carrier device.

It is also proposed that the carrier structure comprises at least one bracing element, which is configured for a support of a plurality of solar elements along a maximum longitudinal extension of the carrier structure, the bracing element having a maximum longitudinal extension of at least 4 m, preferably at least 6 m, preferentially at least 8 m and particularly preferably at least 9 m. An advantageously large energy conversion area can be facilitated. An advantageously stable and robust implementation of the carrier structure is achievable, in particular as it is possible for the solar elements to be fixated on the bracing element such that they are immobile with respect to one another and are free of connections with one another. An advantageously low number of structural components of the carrier structure is achievable. This allows facilitating advantageously low costs for assembly, production and/or maintenance. The bracing element is preferably configured for a bracing of at least one solar element, in particular a plurality of solar elements. Preferentially the bracing element, in particular the maximum longitudinal extension of the bracing element, extends at least substantially parallel to the maximum longitudinal extension of the carrier structure. The bracing element is embodied, for example, as a rail, as a beam, as a strut, or the like. It is conceivable that, in particular viewed in a section plane that is oriented at least substantially perpendicularly to the maximum longitudinal extension of the bracing element, the bracing element is implemented structurally identical or identical to the carrier element. The bracing element, for example, forms a hollow profile, is embodied as a C-profile, is implemented at least partially open when viewed along the maximum longitudinal extension of the bracing element, and/or comprises in an assembled operation state at least one downward-extending slant surface, viewed in a direction from an upper side of the bracing element towards the water surface. The bracing element, in particular the maximum longitudinal extension of the bracing element, in particular extends at least to a major part, in particular at least substantially completely, over the maximum longitudinal extension of the carrier structure and/or of the floating carrier device. Preferably the carrier structure, in particular the bracing element, is configured to support at least one solar element or a plurality of solar elements along the maximum longitudinal extension of the carrier structure and/or of the bracing element. For a bracing of the solar element(s), the carrier structure, in particular the bracing element, is in particular configured to receive solar elements over a large portion of the maximum longitudinal extension of the carrier structure and/or of the bracing element, in particular over the at least substantially entire maximum longitudinal extension of the carrier structure and/or of the bracing element. Especially preferentially the carrier structure comprises at least two, in particular at least four, bracing elements, which are arranged at least substantially parallel to each other and at least substantially parallel to the maximum longitudinal extension of the carrier structure and/or of the floating carrier device.

Furthermore it is proposed that the floating body delimits at least one hollow space having a maximum volume of more than 400 liters, preferably more than 500 liters, preferably more than 700 liters and particularly preferably more than 720 liters. An advantageously great buoyancy force of the individual floating bodies is achievable. An advantageously stable and robust implementation of the individual floating bodies can be made possible. An advantageously low number of floating bodies for supporting the floating carrier device on the water body is achievable. This allows advantageously low costs for assembly, production and/or maintenance. The maximum volume of the floating body is preferably implemented by way of precisely one recess that is delimited by the floating body. The floating body preferentially has a maximum outer surface comprising in particular the receiving regions, the stack elements, the side walls and/or the crimp profile(s). The maximum outer surface of the floating body is in particular at least 3 $m^2$, preferably at least 5 $m^2$ and preferentially at least 6 $m^2$. The floating body has a maximum weight that is preferably maximally 50 kg, preferentially maximally 35 kg, preferably no more than 32 kg, particularly preferably no more than 30 kg and very particularly preferably no more than 25 kg. The maximum weight of the floating body is in particular at least 10 kg, preferentially at least 15 kg and preferably at least 20 kg. The floating body preferably has an average wall thickness of at least 4 mm, preferentially at least 5 mm and especially preferentially at least 5.5 mm. The average wall thickness of the floating body is preferably maximally 10 mm, preferentially maximally 9 mm and preferably maximally 7 cm. It is conceivable that, at least in the region of the receiving regions, the floating body has at least partially a higher wall thickness than in regions that differ from the receiving regions.

The floating carrier device preferably comprises at least one anchoring unit, which is configured for fixating and/or securing the floating carrier device on a ground that delimits the water body, in particular on a shore and/or a bank and/or a bottom of the water body. The anchoring unit is preferentially configured for holding and/or securing the floating carrier device in a position relative to a ground against a flow and/or swell and/or wind waves of a fluid that forms the water body. In particular, the anchoring unit is arranged, in particular fixated, on a floating body of the floating carrier device and/or on the carrier structure. Preferably the anchoring unit comprises at least one anchoring element and at least one connection element, wherein in particular the anchoring element is arranged, in particular fixated, on the floating body and/or on the carrier structure via the connection element. The anchoring element is preferentially configured to be fixated to the ground of the water body, in particular via a form-fit and/or force-fit connection. The anchoring element is embodied, for example, as an anchor, as a hook, as a rivet, as a screw, as a drill head or the like. The anchoring element is in particular at least partly sunk and/or screwed in the ground of the water body. The connection element is for example embodied as a lead, as a chain, as a rope, as a wire or the like. The connection element is in particular fixated to the anchoring element on one end of the connection element and is fixated to the floating body and/or to the carrier structure with another end of the connection element that is situated opposite the end. Particularly preferably the anchoring unit, in particular the connection element, is arranged and/or implemented in such a way that the floating carrier device is movable relative to an anchoring position on the ground of the water body, in which in particular the anchoring element is arranged, by at least 1 m, preferably by at least 3 m and preferentially by at least 5 m, preferably without a full tensioning of the connection element, in particular for the purpose of following a swell and/or wind waves. Preferably the connection element is fixated to the floating body and/or to the carrier structure in an at least substantially non-releasable manner, by substance-to-substance bond and/or by a screw or clamp connection. A "substantially non-releasable manner" is in particular meant to describe a connection of at least two components, in particular the connection element and the floating body and/or the carrier structure, which are only separable from each other by using separating tools, like for example a saw, in particular a mechanical saw, etc, and/or by using chemical separation means, like for example solvents etc.

Furthermore a floating body, in particular the above-mentioned floating body, of a floating carrier device according to the invention, in particular the above-mentioned floating carrier device, is proposed, as a result of which a solar device can be made available that is implementable in a particularly advantageous manner. The floating body is preferably configured to be arranged at least partially below a water surface. Preferentially the floating body is implemented as a buoyant body. Particularly preferably the floating body is implemented walkable, in particular walkable by a human. Moreover the floating body is in particular embodied water-tight.

Beyond this a carrier structure, in particular the above-mentioned carrier structure, of a floating carrier device according to the invention, in particular the above-mentioned floating carrier device, is proposed, as a result of which a solar device can be made available that is implementable in a particularly advantageous manner. The carrier structure is preferably made at least substantially of metal. The carrier structure is preferentially made at least substantially of steel, in particular rust-resistant steel. In particular, the carrier structure comprises a corrosion protection. The corrosion protection is in particular achievable by a coating and/or by a composition of an alloy. Preferably the corrosion protection is implemented as a zinc coating. The zinc coating is in particular embodied as a zinc-magnesium coating.

Furthermore a carrier structure is proposed that has a roof structure which is configured to provide assembly surfaces for receiving at least one solar element, as a result of which a solar device can be made available that is implementable in a particularly advantageous manner. Preferably the roof structure may be implemented as a saddle roof structure. Preferentially the roof structure may be implemented as a single-pitch roof structure and/or as a flat roof structure. Preferably the saddle roof structure may also be configured for an east-west orientation, in particular of the assembly surfaces. Furthermore the single-pitch roof structure may preferably be implemented for an orientation to the south, in particular of the assembly surfaces.

Furthermore a solar device is proposed, with a floating carrier device, in particular the above-mentioned floating carrier device, and with at least one solar element, as a result of which a solar device can be made available that is implementable in a particularly advantageous manner. Preferably, by a "solar element" an element may be understood that is implemented for a conversion of a solar radiation energy. The solar element is preferably embodied as a conversion unit for a conversion of a solar radiation energy into thermal energy, in particular for heating a heat exchanger medium. Particularly preferably the solar element is embodied as a photovoltaic cell and/or as a photovoltaic module, which is configured for a conversion of a solar radiation energy into electrical energy.

It is further proposed that the solar device comprises a roof structure that is implemented to accommodate at least two solar elements such that they are directly adjacent to each other, wherein in an assembled operation state the solar elements form an air circulation opening in a highest point. In this way, a passive cooling effect, in particular a chimney effect, is particularly advantageously achievable. Furthermore this allows providing an installation which is advantageously flexibly usable and which is especially advantageously capable of providing a cooling effect that is independent from environmental influences. Preferably a point that is the highest in a vertical direction, in particular a point that is the farthest away from the water surface, is realized as the highest point.

The air circulation opening is in particular arranged in a roof ridge region of the roof structure. The roof ridge region is preferably implemented as an interruption-free opening, preferentially as a continuous opening. It is further conceivable that the air circulation opening is in particular formed of at least two or of a plurality of openings. Preferably the air circulation opening is implemented in the roof ridge region as a spacing between directly adjacent solar elements, which in particular face away from each other, and is implemented larger than 5 mm, advantageously larger than 10 mm, preferably larger than 15 mm, particularly preferably larger than 20 mm and especially advantageously larger than 25 mm. Furthermore the air circulation opening is preferably implemented in the roof ridge region as a spacing between directly adjacent solar elements, which in particular face away from each other, and is implemented smaller than 100 mm, advantageously smaller than 80 mm, preferentially smaller than 60 mm, particularly preferably smaller than 40 mm and especially advantageously smaller than 30 mm. In particular, the air circulation opening between the spaced-apart solar elements is at least largely free of structural components. Preferentially the air circulation opening between the spaced-apart solar elements is completely free of structural components. Preferably the air circulation opening is configured to permit an exit of an ascending air flow, which in particular ascends due to heating up, preferably an exit out of the roof structure. The air circulation opening is in particular configured for an outward conveyance of a vertical airflow, which is in particular due to convection, preferably a conveyance out of the roof structure.

Preferentially the two directly adjacent solar elements are arranged facing away from each other. Particularly preferably the two directly adjacent solar elements are arranged on differing saddle roof side faces.

It is also proposed that the solar device comprises a plurality of solar elements, in particular more than twelve solar elements, which, in particular in an arrangement on the floating carrier device, together have a maximum longitudinal extension of at least 4 m, preferably at least 6 m, preferentially at least 8 m and especially preferentially at least 9 m. It is possible to facilitate an advantageously large energy conversion area of the solar device. An advantageously high energy efficiency and/or an advantageously high generated power output of the solar device are/is achievable. Advantageously low assembly and maintenance costs can be made possible, in particular as on average an advantageously low number of solar devices can be used for producing a given power output that is to be generated. It is in particular conceivable that the solar device comprises only one solar element having a maximum longitudinal extension of at least 4 m, preferably at least 6 m, preferentially at least 8 m and particularly preferably at least 9 m. In an assembled state of the solar device and/or in a state of the solar elements being arranged on the carrier structure, the maximum longitudinal extension of the solar elements is preferably oriented at least substantially parallel to the maximum longitudinal extension of the carrier structure, in particular the bracing element, and/or of the floating carrier device, in particular the main extension plane of the floating carrier device. Preferably the solar elements, in a state when arranged on the carrier structure, are arranged along the maximum longitudinal extension of the solar elements in two rows, which are in particular arranged at least substantially parallel to each other. Especially preferentially the maximum longitudinal extension of the solar elements is to mean the maximum longitudinal extension of all solar elements in a state when arranged on the carrier structure, and is in particular realized differently from a maximum longitudinal extension of the individual solar elements. Preferably, in the assembled state of the solar device and/or in the state of the solar elements being arranged on the carrier structure, the carrier structure, in particular the at least one bracing element, extends at least to a major part, in particular at least substantially completely, over the maximum longitudinal extension of the solar elements, in particular with the solar elements, in particular a row of the solar elements, being arranged, in particular fixated, on the bracing element.

DRAWINGS

Further advantages will become apparent from the following description of the drawings. The drawings show an exemplary embodiment of the invention. The drawings, the description and the claims contain a plurality of features in combination. Someone skilled in the art will purposefully consider the features individually and will find further expedient combinations.

Figure 2:
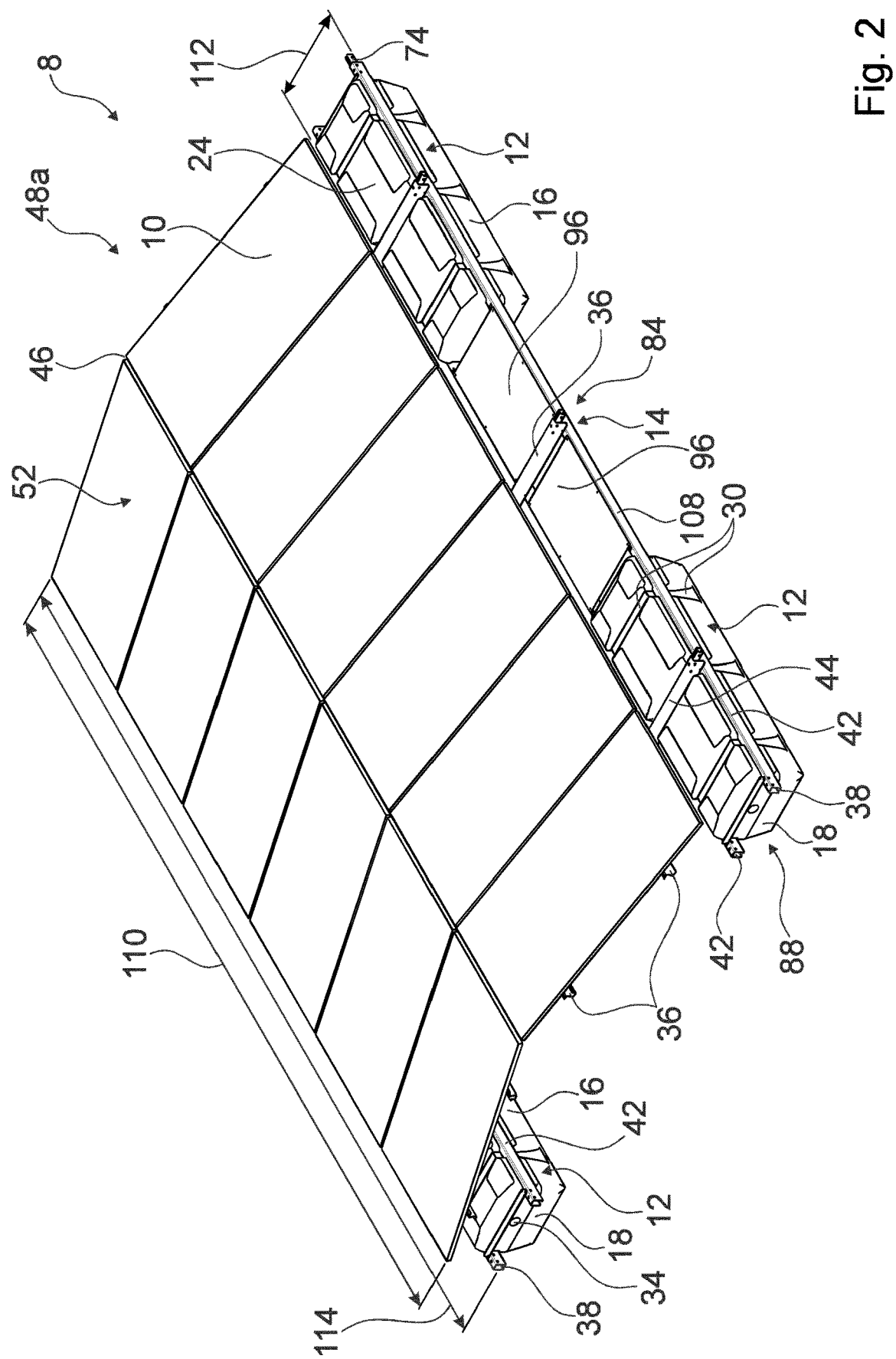
Figure 3:
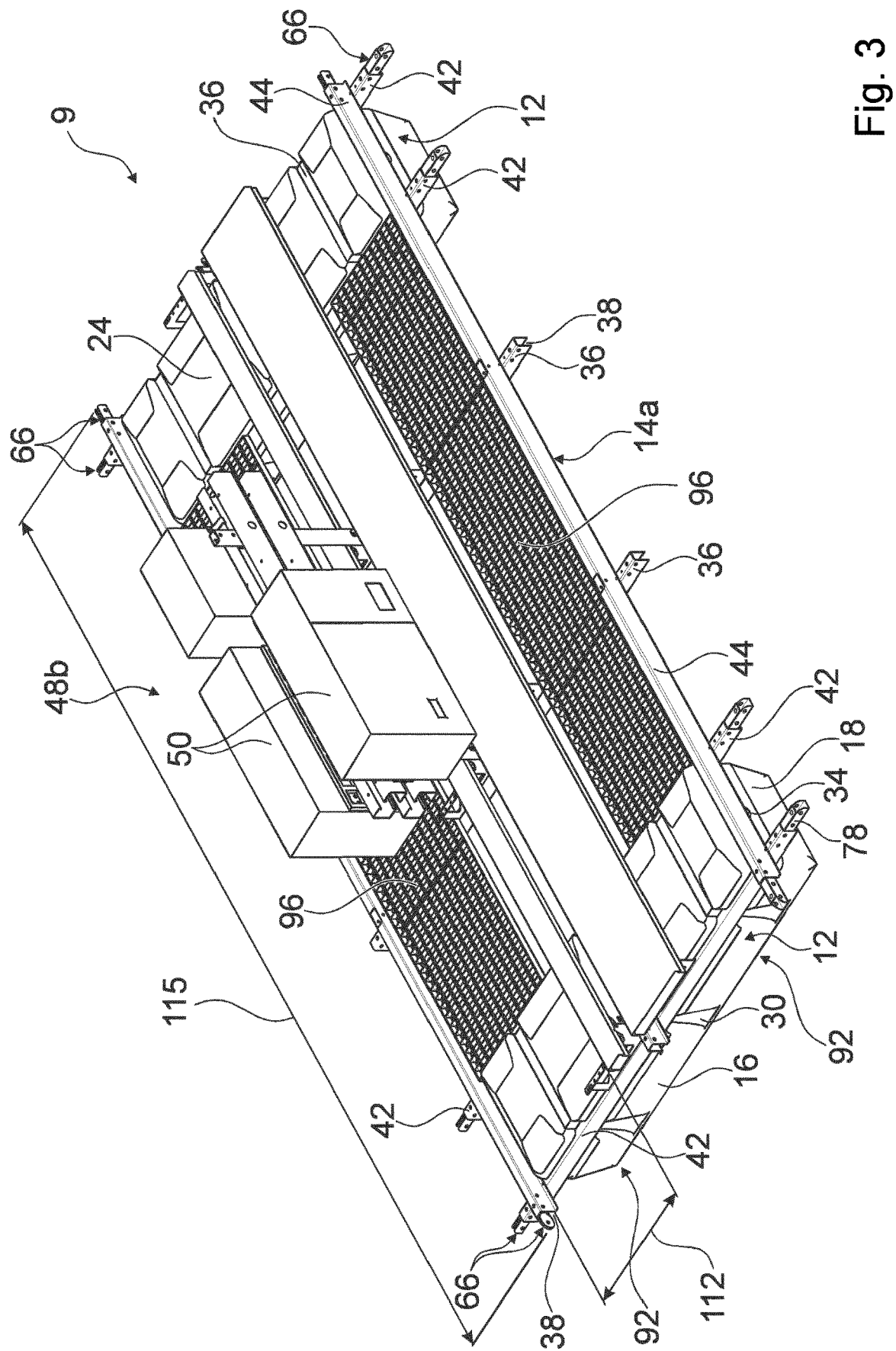
Figure 4:
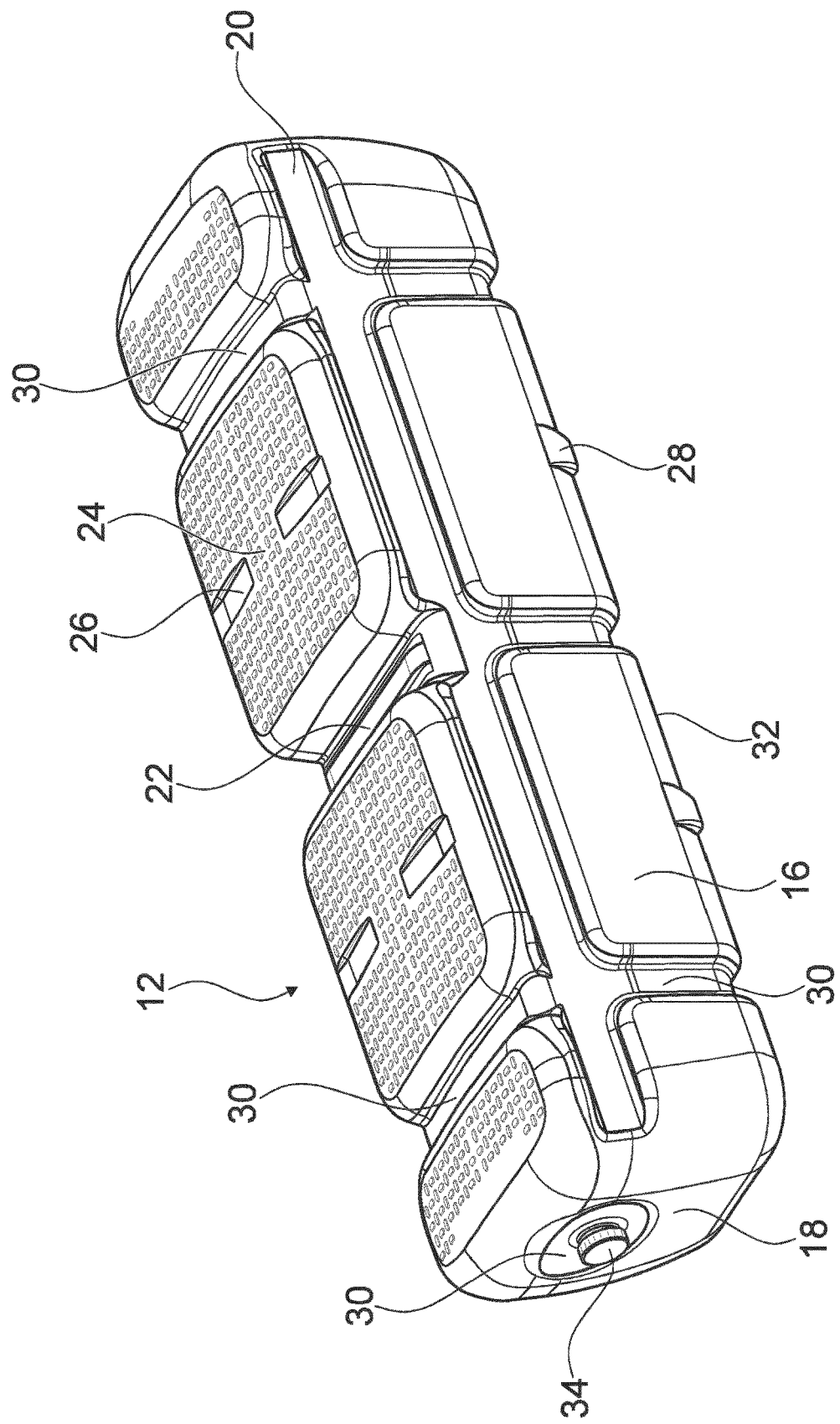
Figure 5A:
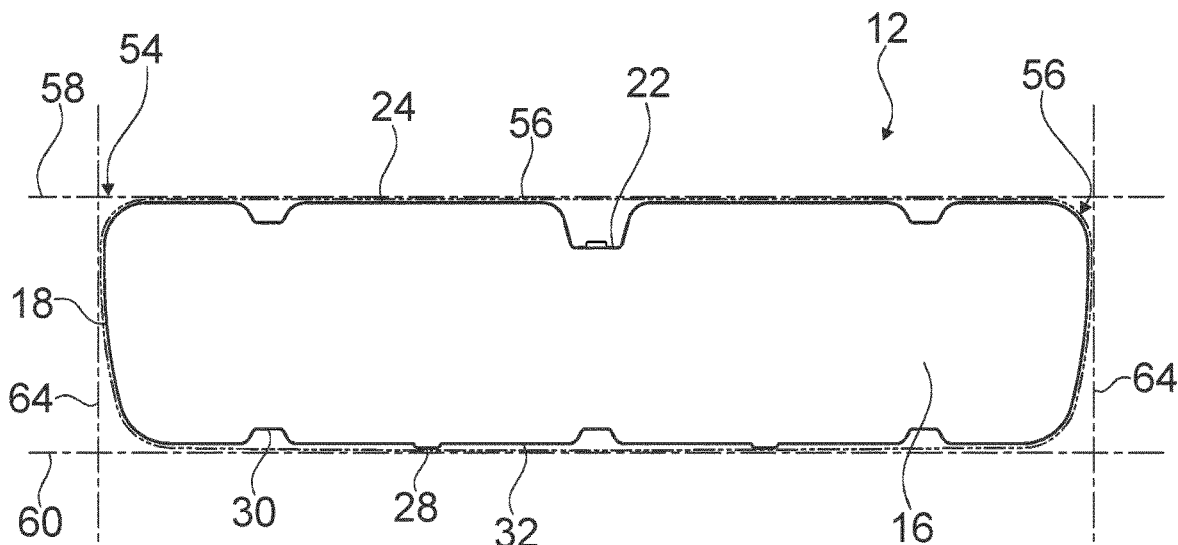
Figure 5B:
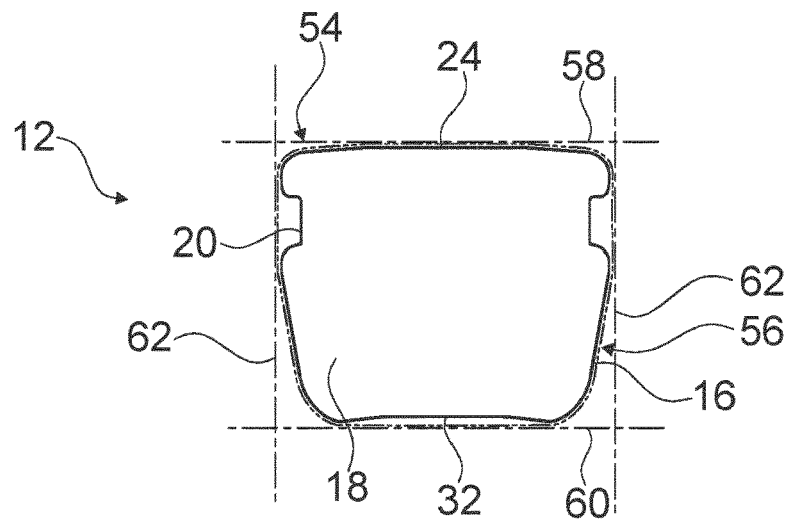
Figure 5C:
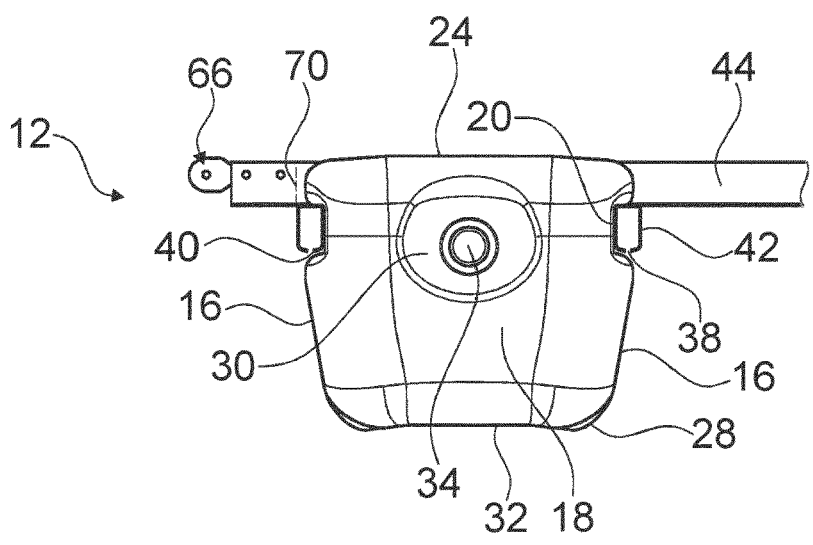
Figure 7:
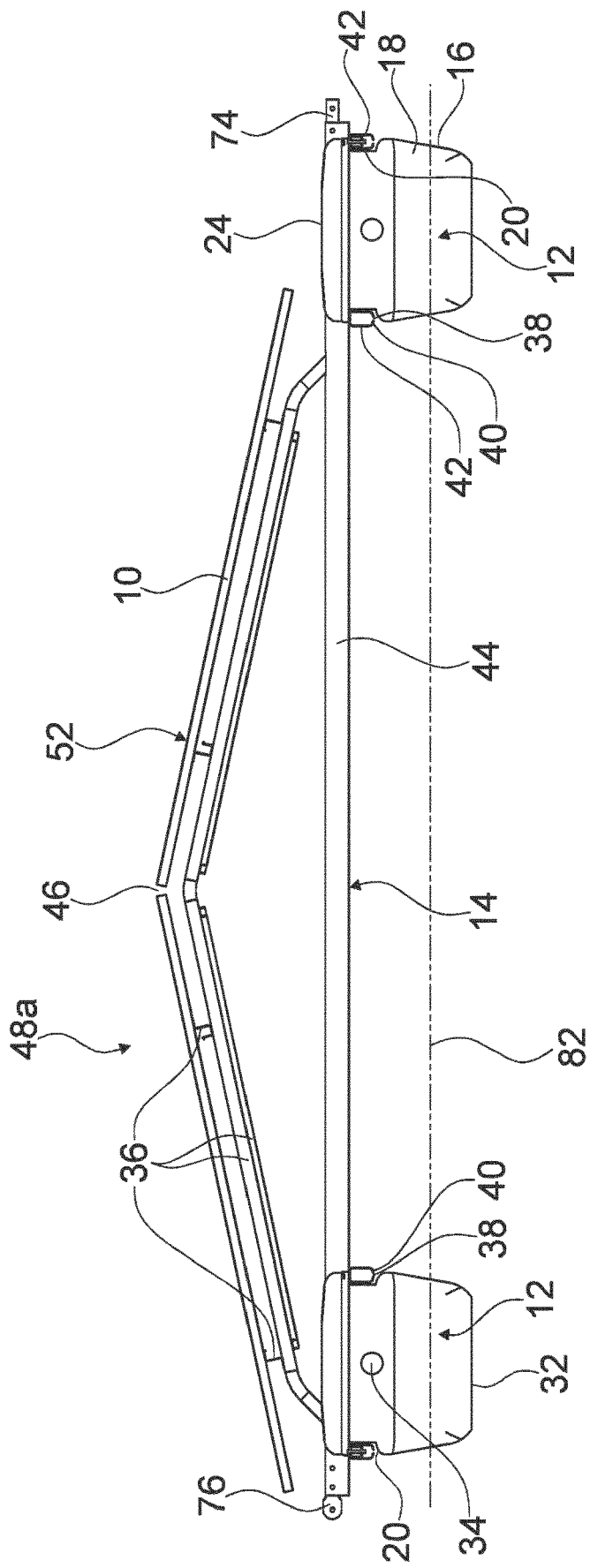
Figure 8:
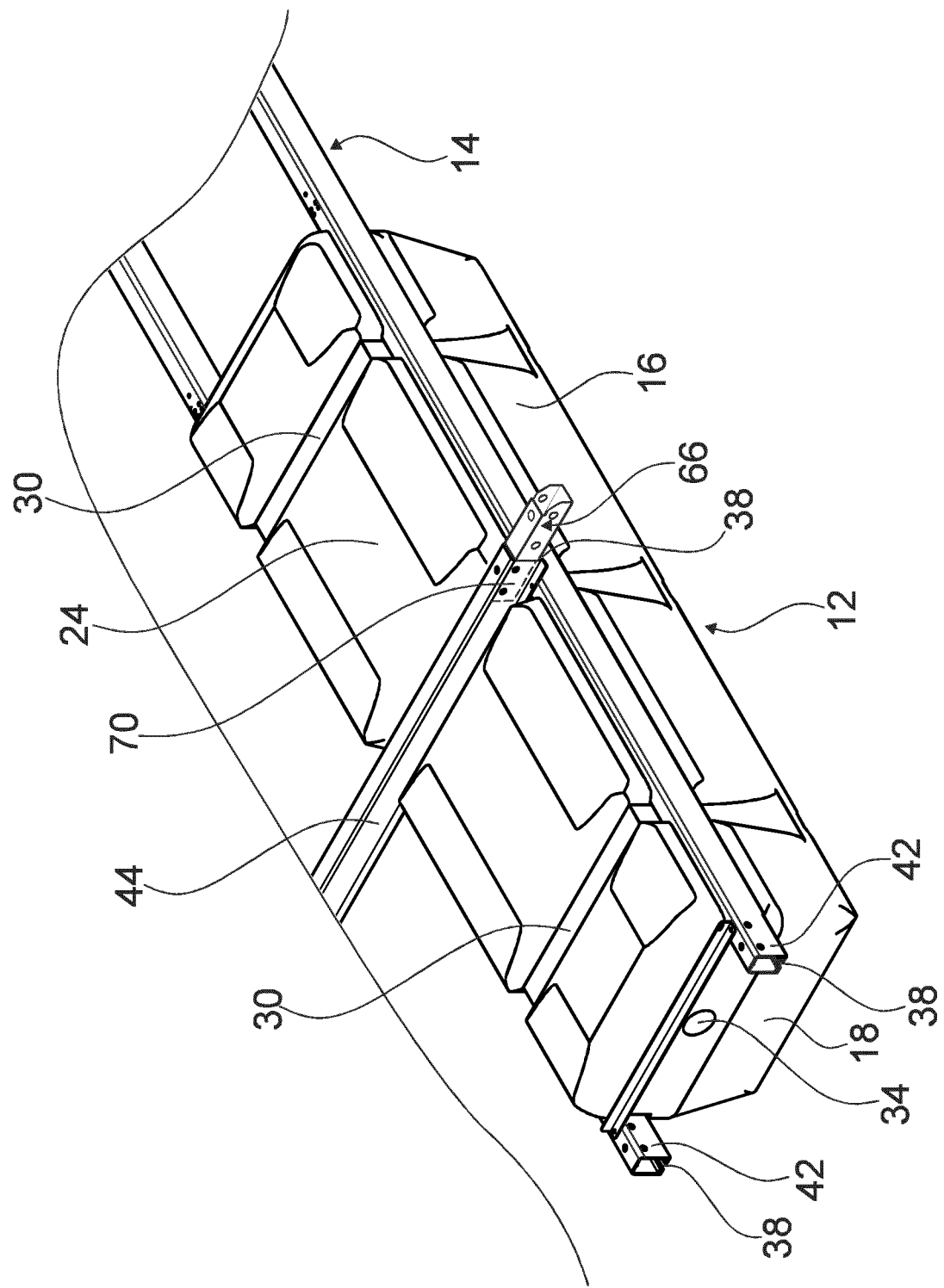
Figure 9:
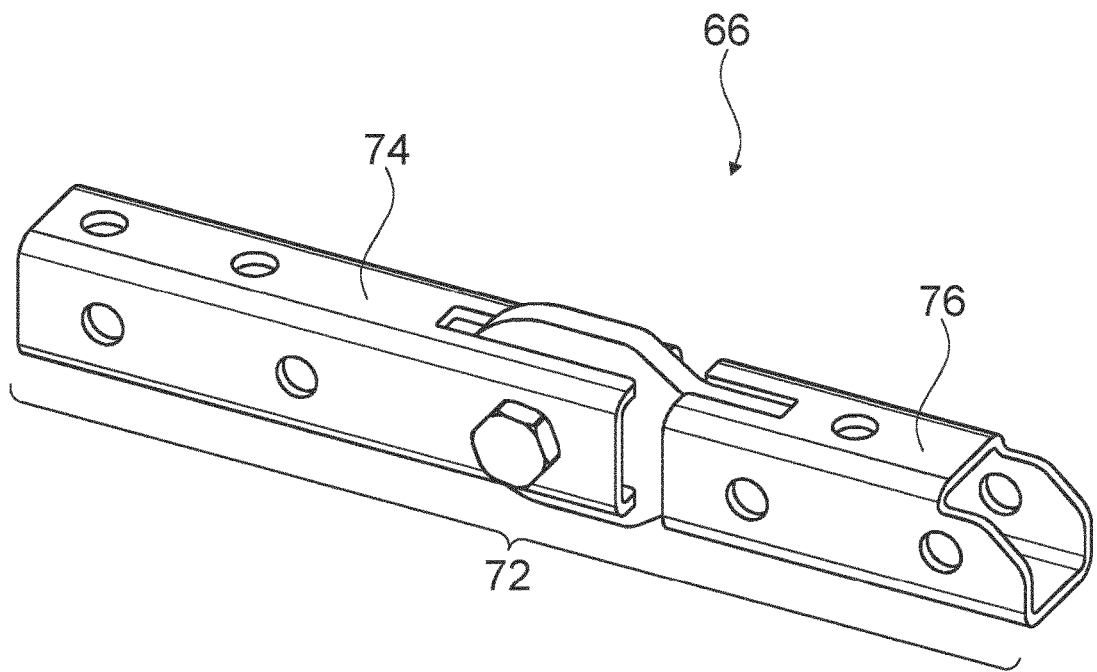
Figure 10:
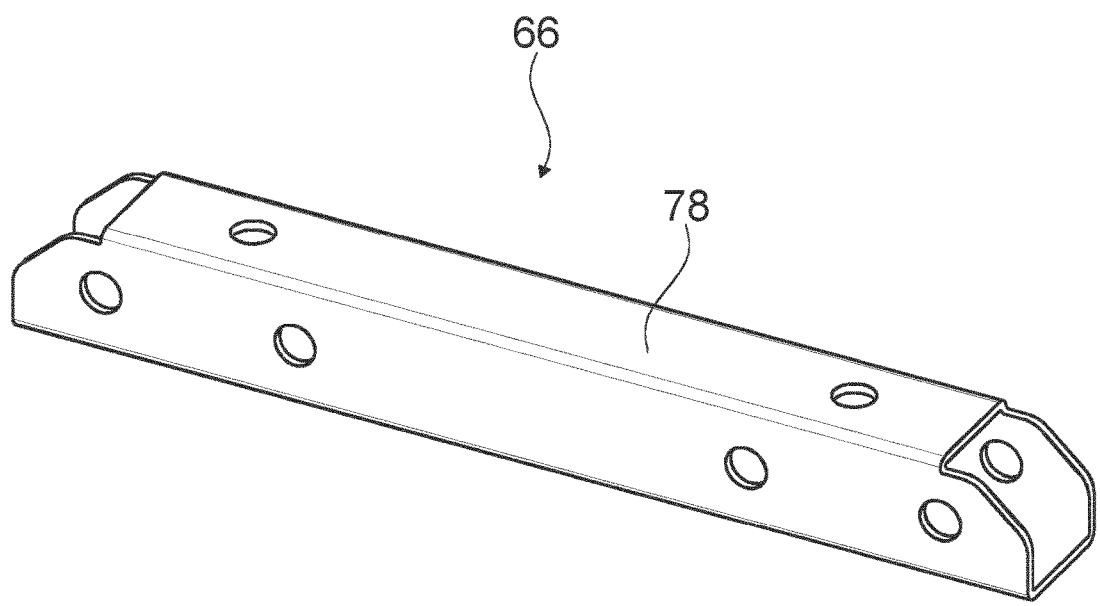
Figure 11:
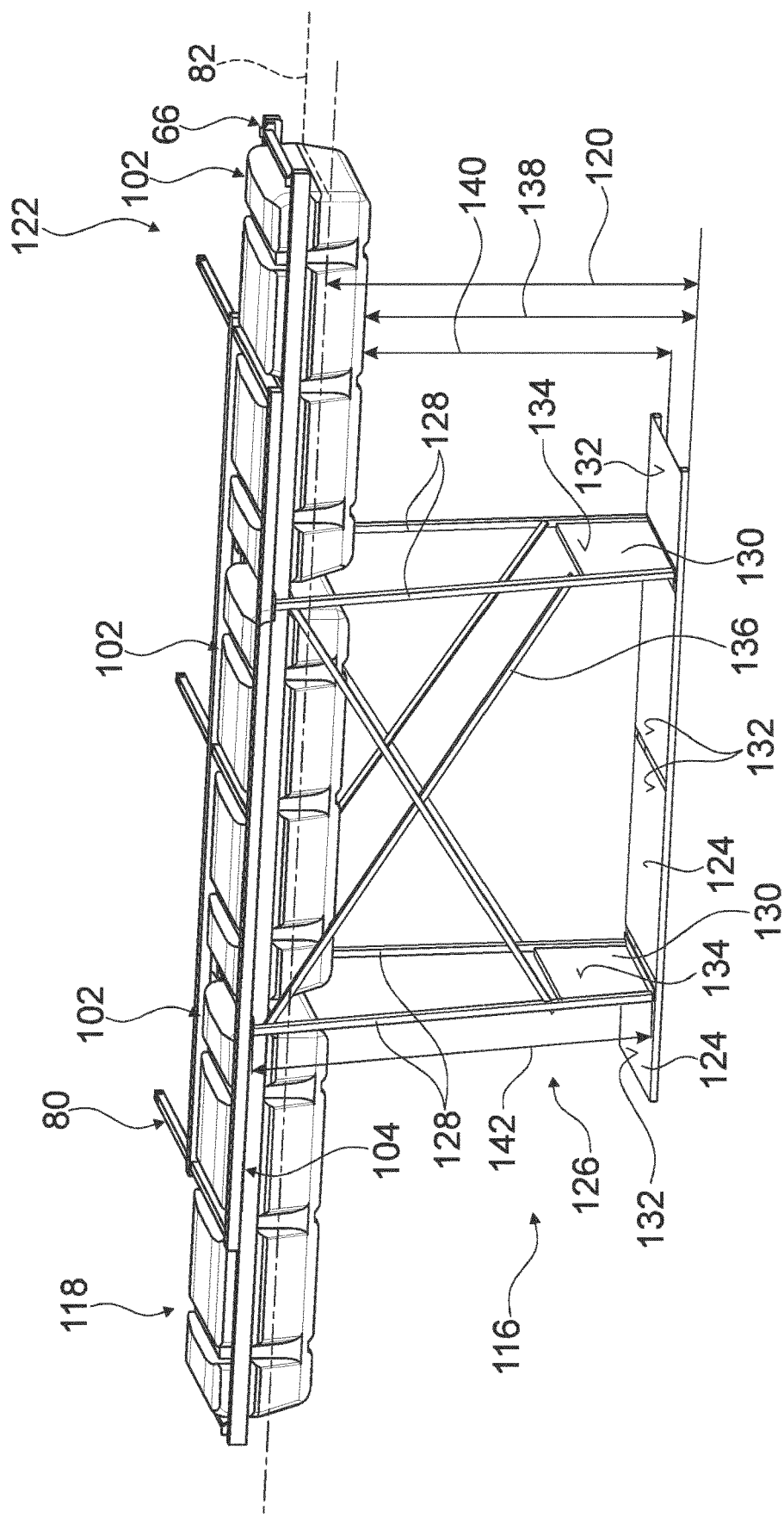
Figure 12A:
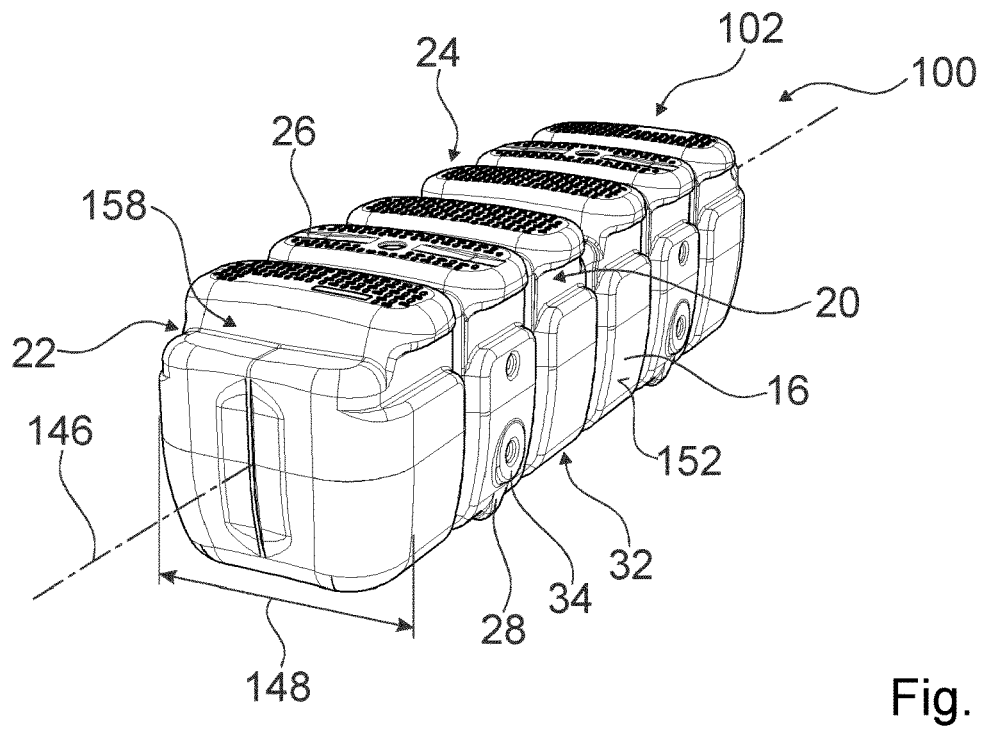
Figure 12B:
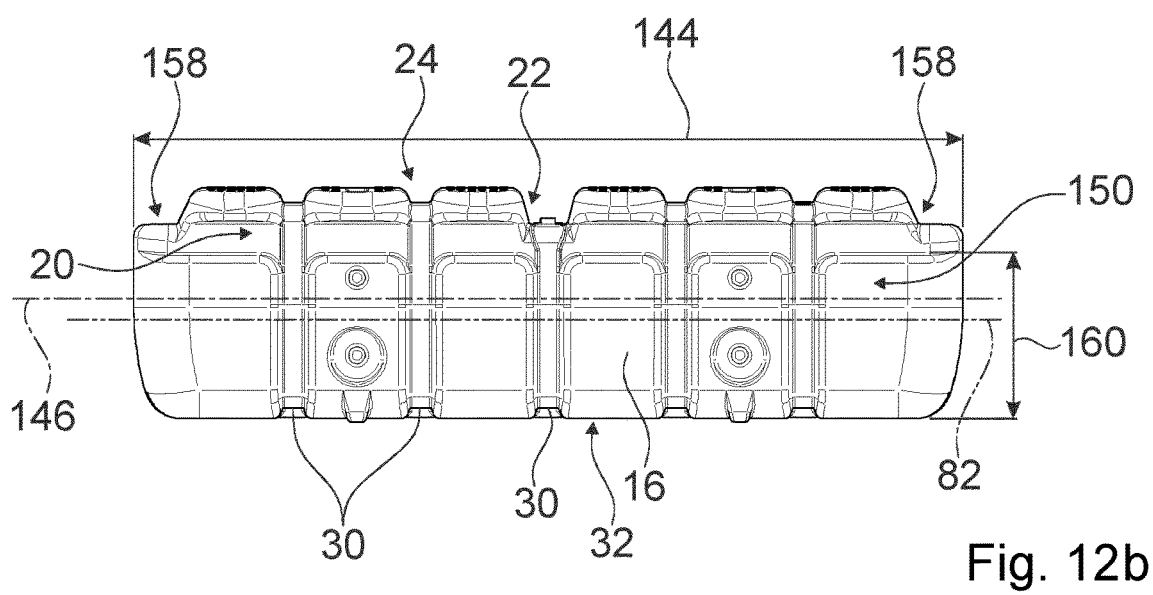
Figure 12C:
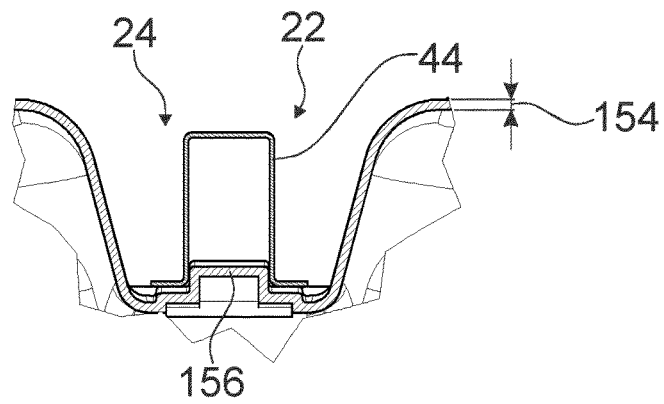
Figure 13:
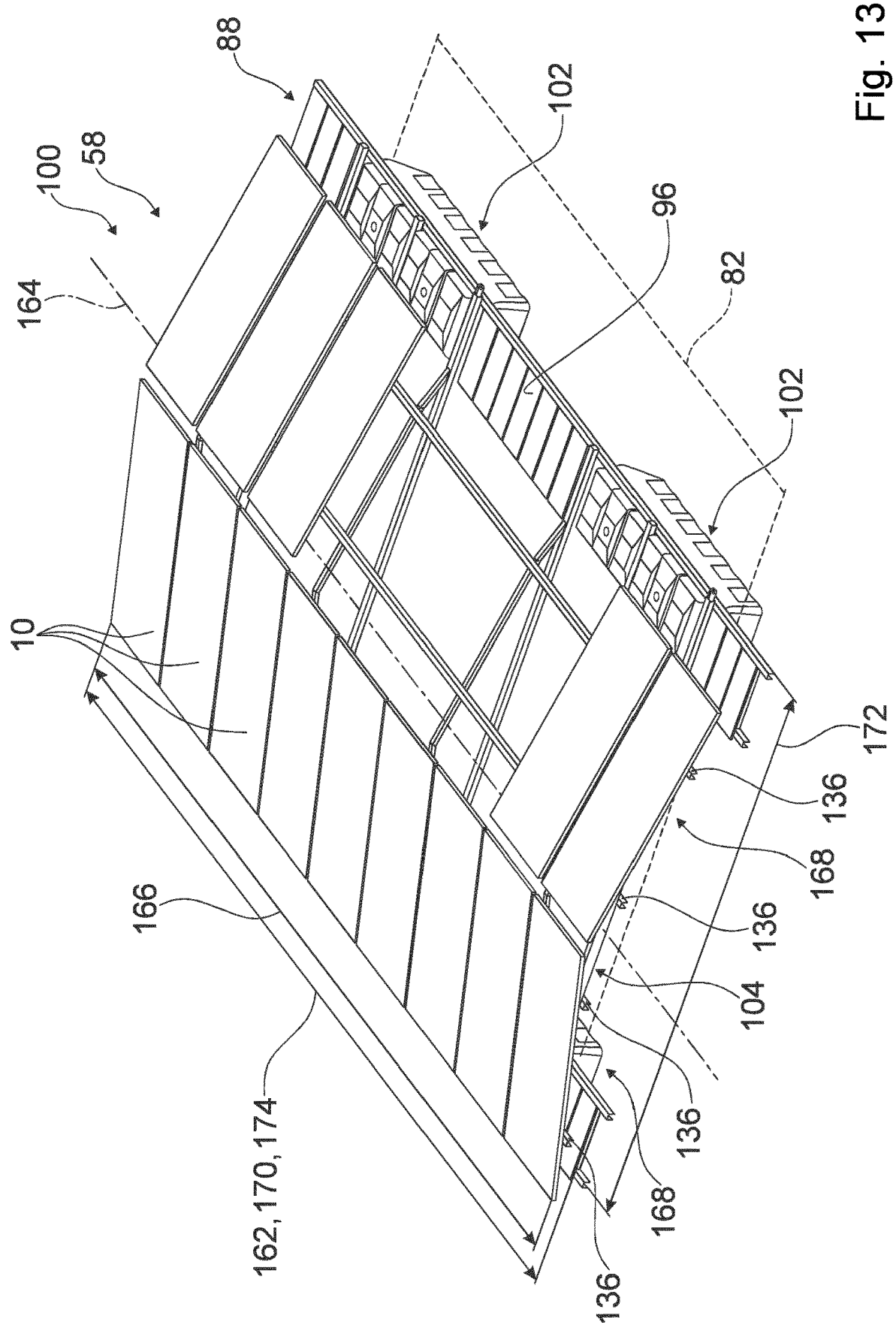
Figure 14:
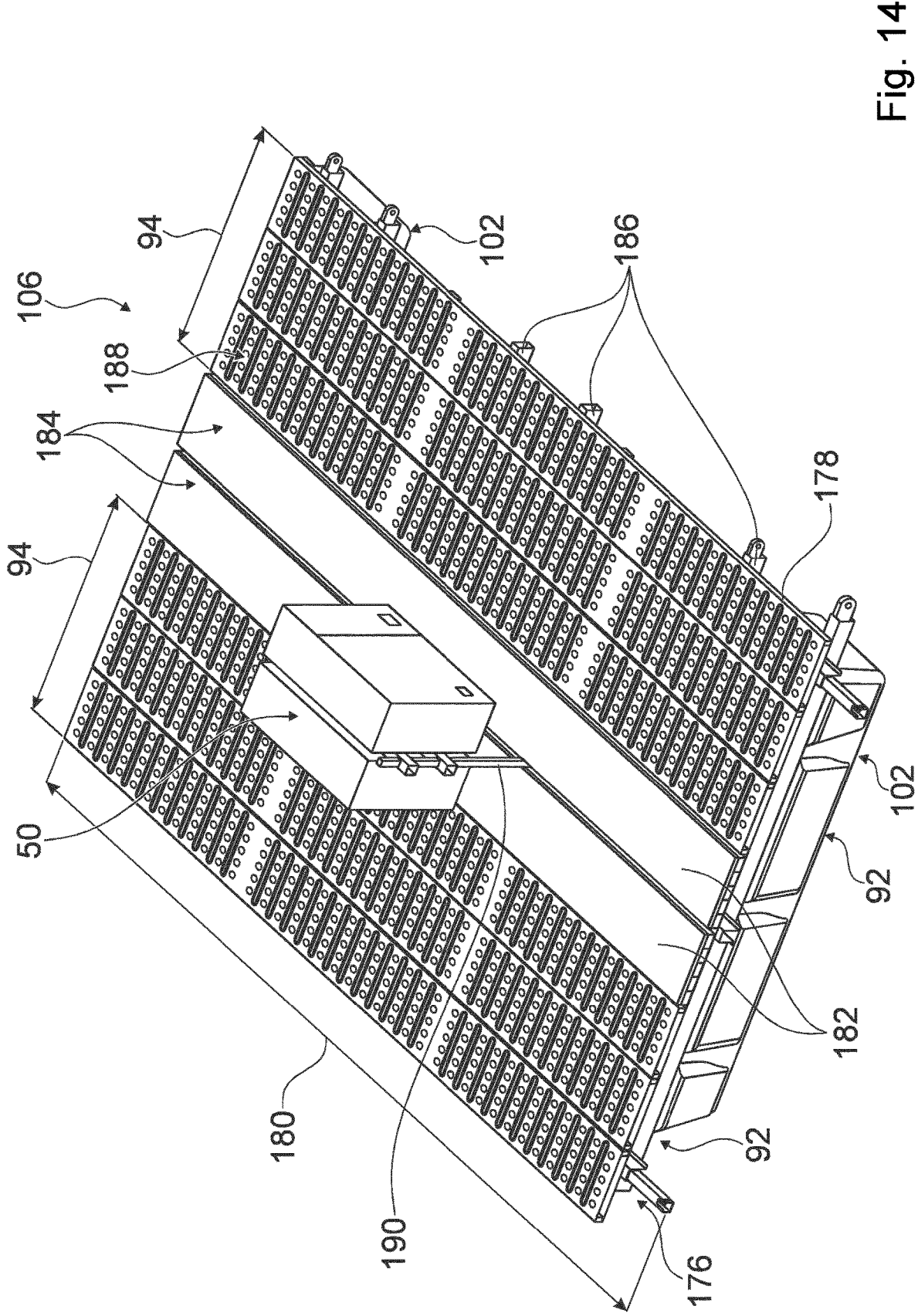

It is shown in:

FIG. 1a an overview of an energy conversion system with a plurality of floating units, four completely illustrated raft units and a wave-breaker device, FIG. 1b a view of a section of the energy conversion system in a transition region between two raft units, wherein the floating units are implemented such that they are connected to one another via rigid connection units and mobile connection units, FIG. 2 a view of a floating unit that is embodied as a floating carrier device, with an energy conversion unit comprising twelve solar elements and with schematically represented floating bodies, FIG. 3 a view of a floating unit that is embodied as a floating carrier device, with a power converter device and with schematically represented floating bodies, FIG. 4 a view of a floating body with an anti-skid structure on its upper side, a receiving region on a side face, a further receiving region on the upper side and with stack elements which are implemented and arranged correlatingly, FIG. 5a a side view of a side wall of the floating body, with a reference rectangular cuboid and with an envelope, FIG. 5b a further side view of the side wall of the floating body, with the reference rectangular cuboid and with the envelope, FIG. 5c a side view of the side wall of the floating body, which has been received in the carrier structure in a floating and form-fit manner, FIG. 6 a top view of the floating unit that is embodied as a floating carrier device, with four floating bodies and with a carrier structure implemented as a saddle roof, as well as with four solar elements and an X-shaped wind bracing, FIG. 7 a side view of the floating unit that is embodied as a floating carrier device, with the carrier structure, FIG. 8 a view of a schematically represented floating body, in an operation state when assembled in the carrier structure, with carrier elements embodied as longitudinal carrier elements and with carrier elements embodied as transverse carrier elements, FIG. 9 a view of a mobile connection unit of the connection device with two connection elements, FIG. 10 a view of a rigid connection unit of the connection device FIG. 11 a perspective view of a floating unit that is embodied as a floating carrier device, with a stabilization device, FIG. 12a a perspective view of an alternative implementation of a floating body of a floating unit that is embodied as a floating carrier device, FIG. 12b a side view of the alternative implementation of the floating body, FIG. 12c a detail view of the alternative implementation of the floating body in a receiving region on an upper side of the floating body, FIG. 13 a perspective view of an alternative implementation of a floating unit that is embodied as a floating carrier device for an accommodation of eighteen solar elements, and FIG. 14 a perspective view of an alternative implementation of a floating unit that is embodied as a floating carrier device with a power converter device.

DESCRIPTION OF THE EXEMPLARY EMBODIMENT

FIG. 1 shows an energy conversion system 6, which is configured to be arranged floating on a water body. The energy conversion system 6 is realized as a solar park. The solar park comprises an array of a plurality of floating units 48a, 48b, which are embodied as floating carrier devices 8, 9. The floating carrier devices 8, 9 and/or the floating units 48a, 48b are implemented as floating boats which float on a water surface 82 of the water body, in particular by way of floating bodies 12.

Preferentially at least one of the floating carrier devices 8 comprises an anchoring unit 84, which is configured to fixate and/or secure the floating carrier device 8 to a ground delimiting the water body, in particular to a shore or a bank and/or a bottom of the water body. In particular, the anchoring unit 84 is not shown in detail in the figures. Preferably the anchoring unit 84 is configured for a holding and/or securing of the floating carrier device 8 in a position relative to the ground against a flow and/or a swell and/or wind waves of a fluid that forms the water body. In particular, the anchoring unit 84 is arranged, in particular fixated, on a floating body 12 of the floating carrier device 8 (see FIG. 2) and/or on a carrier structure 14 of the floating carrier device 8 (see FIG. 2). The anchoring unit 84 preferentially comprises an anchor element and a connection element (not shown in the figures), with in particular the anchoring element being arranged, in particular fixated, on the floating body 12 and/or on the carrier structure 14 via the connection element. Preferably the anchoring element is configured to be fixated to the ground of the water body, in particular via a form-fit and/or force-fit connection. The anchoring element is, for example, embodied as an anchor, as a hook, as a rivet, as a screw, as a drill head, or the like. In particular, the anchoring element is at least partly sunk and/or screwed in the ground of the water body. The connection element is, for example, embodied as a lead, as a chain, as a rope, as a wire, or the like. In particular, the connection element is fixated with one end of the connection element on the anchoring element and with another end of the connection element, which is situated opposite the end, on the floating body 12 and/or on the carrier structure 14. Especially preferentially the anchoring unit 84, in particular the connection element, is arranged and/or implemented in such a way that the floating carrier device 8 is movable, relative to an anchoring position on the ground of the water body which in particular the anchoring element is arranged on, by at least 1 m, preferably by at least 3 m and particularly preferably by at least 5 m, preferably without fully tensioning the connection element, in particular for the purpose of following wind waves and/or swell. The connection element is preferably fixated on the floating body 12 and/or on the carrier structure 14 at least substantially non-releasably, by substance-to-substance bond and/or via a screw or clamp connection. Furthermore implementations are conceivable in which more than one floating carrier device 8 of the energy conversion system 6 comprises an anchoring unit 84. In particular, the anchoring units 84 are respectively arranged on a floating carrier device 8 such that they are evenly distributed over an area of the water body covered by the energy conversion system 6 and/or along an outer side of the energy conversion system 6 that delimits the energy conversion system 6. Alternatively or additionally it is conceivable that the anchoring unit 84, in particular the connection element, is arranged, in particular fixated, on a wave-breaker device 80 of the floating carrier device 8 and/or of the energy conversion system 6. It is conceivable that a floating carrier device 8 of the energy conversion system 6, comprising an anchoring unit 84, is connected with at least one further floating carrier device 8 of the energy conversion system 6, which is arranged side by side with the floating carrier device 8, in particular for the purpose of augmenting a stability of the floating carrier device 8 and/or of the energy conversion system 6. The floating carrier device 8 comprising the anchoring unit 84 preferably comprises at least one coupling element (not shown in the figures), preferentially a plurality of coupling elements, which is in particular configured for an at least substantially rigid connection and/or fixation of the floating carrier device 8 and the further floating carrier device 8 with one another. In particular, the coupling element is configured for a securing and/or holding of the floating carrier device 8 and the further floating carrier device 8 against a tilting relative to one another. The coupling element is preferably connected with and/or fixated to a carrier structure 14 and/or a connection device 66 of the floating carrier device 8. Preferentially the coupling element is connected with and/or fixated to a carrier structure 14 and/or a connection device 66 of the further floating carrier device 8.

The floating carrier devices 8 of the energy conversion system 6 are preferably implemented and/or arranged in such a way that the energy conversion system 6 comprises a walkable alleyway 88 over a large portion of a maximum longitudinal extension 86 of the energy conversion system 6, in particular over an at least substantially entire maximum longitudinal extension 86 of the energy conversion system 6.

Preferentially the floating carrier devices 8 of the energy conversion system 6 are implemented and/or arranged in such a way that the energy conversion system 6 comprises a further walkable alleyway 92 over a large portion of a maximum transverse extension 90 of the energy conversion system 6, in particular over an at least substantially entire maximum transverse extension 90 of the energy conversion system 6. The alleyway 88 and/or the further alleyway 92 preferentially have/has a maximum transverse extension 94 of at least 80 cm, preferably at least 90 cm and preferentially at least 100 cm. In particular, the alleyway 88 and/or the further alleyway 92 are/is implemented of bottom elements 96 and floating bodies 12 of the floating carrier devices 8 of the energy conversion system 6, which are in particular arranged in at least one row, at least substantially parallel to the maximum longitudinal extension 86 of the energy conversion system 6 or to the maximum transverse extension 90 of the energy conversion system 6.

The energy conversion system 6 in particular comprises a plurality of alleyways 88 and a plurality of further alleyways 92. In particular, a number of alleyways 88 of the energy conversion system 6 corresponds to a number of floating carrier devices 8 of the energy conversion system 6 which are arranged successively in a direction that is oriented at least substantially perpendicularly to the maximum longitudinal extension 86 of the energy conversion system 6. In particular, each floating carrier device 8 of the energy conversion system 6 forms at least a portion of an alleyway 88 and/or of a further alleyway 92.

FIG. 2 shows an overview of a floating carrier device 8 with twelve mounted solar elements 10. Particularly preferably the floating carrier device comprises twelve solar elements 10. The floating carrier device 8 comprises four floating bodies 12. Furthermore the floating carrier device 8 comprises the carrier structure 14 that is coupled with the floating bodies 12. It is further conceivable for the floating carrier device 8 to comprise a greater or a smaller number of floating bodies 12. For example, the floating carrier device 8 could comprise two or three or five floating bodies 12. It is also conceivable that the floating carrier device 8 accommodates a greater or a smaller number of solar elements 10. For example, the floating carrier device 8 could accommodate two or eight or fourteen solar elements 10.

The floating carrier device 8 is configured to support an energy conversion unit 52 floating on a water body, the energy conversion unit 52 comprising twelve photovoltaic modules that are embodied as solar elements 10. Principally the energy conversion unit 52 preferably comprises eighteen photovoltaic modules that are embodied as solar elements 10. The solar elements 10 are realized as photovoltaic modules. The photovoltaic modules are configured for a conversion of solar radiation energy into electrical current. The floating carrier device 8 implements a floating unit 48a with four floating bodies 12.

Furthermore, the floating carrier device 8 with the carrier structure 14 is configured to transfer a support force of the twelve solar elements 10 to the four floating bodies 12.

Moreover, a carrier structure 14a is configured to transfer a support force from a power converter device 50 to two floating bodies 14 (see FIG. 3). The power converter device 50 is embodied as a power inverter. The power inverter is configured to change a direct current generated by the solar elements 10 of several floating units 48b into an alternating current. The power inverter is realized with a power output of 40 VA. A maximum input voltage of the power inverter is 1100 V DC. An output voltage of the power inverter is 400 V AC.

The floating carrier device 8, 9, in particular the floating carrier device 8, 9 shown in FIG. 2 and/or a floating carrier device 8, 9 shown in FIG. 3, preferably comprises a plurality of bottom elements 96, which are arranged on the carrier structure 14. The bottom elements 96 are configured, in particular together with the floating bodies 12, to form a walkable surface of the floating carrier device 8, 9. The bottom elements 96 are in particular embodied as step plates. Other implementations of the bottom elements 96 are also conceivable. Preferentially the bottom elements 96 are configured to be arranged between the floating bodies 12. Preferably the bottom elements 96 are fixated on the carrier structure 14. For example, the bottom elements 96 each comprise, on at least two sides facing away from each other, respective receptacles which are configured for a fixation on a carrier element 36 and/or on a bracing element 108 of the carrier structure 14. In particular, the bottom elements 96 lie upon the carrier structure 14 via the receptacles.

The bottom elements 96 are preferably embodied at least substantially in the shape of panels. Preferably the bottom elements 96 delimit a plurality of pass-throughs, in particular such that they are distributed over a main extension plane of the bottom elements 96 (not shown in FIG. 2; see FIGS. 3, 13 and 14). In a state when the bottom elements 96 are fixated, in particular mounted, on the carrier structure 14, the pass-throughs extend from an upper side of the bottom elements 96 over an entire height of the bottom elements 96 to an underside of the bottom elements 96. The pass-throughs are preferably configured for conveying water through the bottom elements 96 from the upper side of the bottom elements 96 in a perpendicular direction. The pass-throughs are preferentially configured to at least substantially prevent a retention of water on the bottom elements 96. The bottom elements 96 are preferably embodied at least partly in an anti-skid fashion, in particular on an upper side of the bottom elements 96. In a preferred implementation the bottom elements 96 form edgings delimiting the pass-throughs (not shown in the figures) and having an anti-skid effect. For example, the pass-throughs are embodied in a round or in an angular manner. The pass-throughs and/or the edgings of one bottom element 96 preferentially feature a plurality of differing implementations. The bottom elements 96 are preferably embodied of aluminum or of, in particular furrowed or perforated, sheet metal. However, other implementations of the bottom elements 96 are also conceivable.

In particular in the implementation of the floating carrier device 8 shown in FIG. 2, bottom elements 96 of the floating carrier device 8 form, together with floating bodies 12 of the floating carrier device 8, an alleyway 88 that extends on one side of the solar elements 10. Preferentially the alleyway 88 extends at least substantially completely over a maximum longitudinal extension 110, 114 of the solar elements 10 and/or of the floating carrier device 8. In particular in the implementation of the floating carrier device 9 shown in FIG. 3, bottom elements 96 of the floating carrier device 9 form, together with floating bodies 12 of the floating carrier device 9, two further alleyways 92, which extend on two sides of the power converter device 50. In particular, the alleyway 88 and/or the alleyways 92 have/has a maximum transverse extension 112 of at least 80 cm, preferably at least 90 cm and preferentially at least 100 cm. Preferentially the two further alleyways 92 respectively extend at least substantially completely over a maximum longitudinal extension 114 of the floating carrier device 9, in particular the floating carrier device 9 shown in FIG. 3. Particularly preferably the power converter device 50, in particular the power converter device 50 shown in FIG. 3, is embodied to be walkable via the two further alleyways 92, in particular the bottom elements 96 and/or the floating bodies 12 of the floating carrier device 9.

In FIG. 4 the floating body 12 is represented. The floating body 12 is configured for a generation of a buoyancy force.

The floating body 12 is furthermore implemented as a closed hollow body. The floating body 12 is implemented of a single contiguous hollow space. Furthermore the floating body 12 comprises a closure element 34. The closure element 34 is embodied as a screw lid. The closure element 34 is configured for a closure of a single opening of the floating body 12. Furthermore the closure element 34 is configured for a water-tight closure. The closure element 34 is, in at least one operation state, embodied as an air-tight closure. The closure element 34 comprises a pressure-compensation valve. Principally it is conceivable for the closure element 34 to be realized free of a pressure-compensation valve. Herein temperature-dependent expansion and/or compression of the floating body 12 are/is compensated within a range of an elastic deformability of the floating body 12. The pressure-compensation valve comprises an airtight closure in at least one operation state. In a further operation state the pressure-compensation valve is implemented to be air-permeable, which is the case if a certain overpressure or negative pressure has been reached in the floating body 12. The floating body 12 is furthermore realized having a length of approximately 1.98 m, a width of approximately 0.59 m and a height of approximately 0.49 m. The four floating bodies 12 are configured to support a total load of approximately 1820 kg above an ideal water surface 82. The floating body 12 has a volume of approximately 455 liters. Principally it is advantageously also conceivable that the floating body 12 has a volume of 900 liters, the four floating bodies 12 being configured to support a total load of 3600 kg above an ideal water surface.

Each floating body 12 comprises on two side walls 16 a receiving region 20 for the carrier structure 14, 14a. The side wall 16, 18 of the floating body 12 is a wall of the floating body 12 whose envelope section faces toward a reference side face 62, 64 of a smallest imaginary reference rectangular cuboid 54, the reference rectangular cuboid 54 just still completely enclosing the floating body 12 (see FIG. 5a, 5b). Preferably an envelope 56 is a geometrically smallest free geometry enveloping a body. The envelope 56 is free of inflection points. In an assembled operation state of the floating body 12 the smallest imaginary rectangular cuboid 54 comprises a reference upper side 58 and a reference underside 60. The reference upper side 58 and the reference underside 60 are arranged at least substantially parallel to the ideal water surface 82. The reference rectangular cuboid 54 comprises four reference side faces 62, 64. In an assembled operation state the reference side faces 62, 64 are arranged perpendicularly to the ideal water surface 82. The two reference side faces 62 and the two reference side faces 64 are arranged respectively parallel to one another. A surface of the floating body 12 faces towards a reference surface if a surface normal of the envelope section of the floating body 12, relative to a reference surface normal of the respective reference surface of the reference rectangular cuboid 54, comprises a parallel component having a total value of more than/equal to 50% of the total value of the surface normal. The four side walls 16, 18 are configured to connect an upper side 24 and an underside 32 of the floating body 12 to each other. The respectively two envelope sections of the side walls 16 each face towards a reference side face 62. Furthermore respectively two envelope sections of the side walls 18 each face towards a reference side face 64.

The receiving region 20 is arranged on two side walls 16 (cf. FIG. 4). The two reference side faces 62 of the side walls 16 are arranged parallel to one another. The receiving region 20 provides for the carrier structure 14, 14a a support surface for a support of support forces. The receiving region 20 comprises a receiving contour. The receiving contour is configured for a delimitation of the receiving region 20. The receiving region 20 is furthermore implemented as a deepening. The deepening is implemented as a combination of a U-shape and a V-shape, the flanks of the U-shape being formed in a V-shape. The receiving region 20 on the side wall 16 has a cross section increasing in the direction of the reference surface normal of the allocated reference side face 62. The receiving region 20 has a smallest cross section in a deepest point in the floating body 12. Starting from the deepest point of the receiving region 20 in the floating body 12, the cross section of the receiving region 20 increases in the direction of a reference surface normal.

The floating body 12 further comprises on its upper side 24 a further receiving region 22 for the carrier structure 14, 14a, which is also shown in FIG. 4. The upper side 24 has a curved surface. The curved upper side 24 of the floating body 12 is implemented in a convex fashion. As a result of this, in particular a stability of the floating body 12 is advantageously augmented. In an assembled operation state the upper side 24 of the floating body 12 is arranged above the ideal water surface 82 and is furthermore spaced apart from the ideal water surface 82.

The further receiving region 22 is arranged on the upper side 24 of the floating body 12. The further receiving region 22 provides for the carrier structure 14, 14a a support surface for a support of support forces. The further receiving region 22 comprises a receiving contour. The receiving contour is configured for a delimitation of the further receiving region 22. The further receiving region 22 is furthermore implemented as a deepening. The deepening is implemented as a combination of a U-shape and a V-shape, the flanks of the U-shape being formed in a V-shape.

The further receiving region 22 on the upper side 24 of the floating body 12 has a cross section increasing in the direction of the reference surface normal of the allocated reference upper side 58. The further receiving region 22 has a smallest cross section in a deepest point in the floating body 12. Starting from the deepest point of the further receiving region 22 in the floating body 12, the cross section of the further receiving region 22 increases parallel to a direction of the reference surface normal. In a valley bottom of the further receiving region 22 a contour is realized for receiving a carrier element 44 that is embodied as a transverse carrier element. The contour is realized to be correlating with a contour of the hollow profile of the carrier element 44 embodied as a transverse carrier element. The contour is implemented for a centering of the carrier element 44 embodied as a transverse carrier element in the further receiving region 22 (see FIG. 4).

Furthermore the receiving region 20 and the further receiving region 22 are embodied integrally with the floating body 12. The receiving region 20 and the further receiving region 22 are formed in one piece with the floating body 12. The receiving region 20 and the further receiving region 22 have an increased material thickness relative to other wall regions. The receiving region 20 and the further receiving region 22 have a material thickness of up to 10 mm. Other regions have a minimum material thickness of up to 2 mm. Due to the increased material thickness in the receiving region 20 and the further receiving region 22, a temperature-dependent expansion or contraction of the floating body 12 is advantageously realized rather in regions having a comparably smaller material thickness. The floating body 12 has a deepening that implements the receiving region 20 and the further receiving region 22. The receiving region 20 and the further receiving region 22 and the floating body 12 are formed from one piece. The floating body 12 is produced at least substantially by an extrusion blow procedure. The floating body 12 is made of a food-safe HDPE synthetic material. The floating body 12 furthermore has an additive coloring. The floating body 12 furthermore has an additive UV protection. Moreover the receiving region 20 and the further receiving region 22 as well as the floating body 12 are produced from a blank by an extrusion blow procedure.

The receiving region 20 and the further receiving region 22 are furthermore configured for a form-fit accommodation of the carrier structure 14, 14a, which is shown in FIG. 5c and FIG. 8. The carrier structure 14, 14a is in a geometrical engagement with the receiving region 20 and with the further receiving region 22. The floating body 12 is in an assembled operation state free of penetrations of an outer shell. The carrier elements 36 partially enclose the floating body 12. Carrier elements 12 realize a form-fit around the floating body 12. In an assembled operation state the form-fit is configured for a delimitation of a horizontal and vertical movement of the floating body 12. The form-fit accommodation is free of fixation means entering the floating body 12. The form-fit accommodation is implemented non-destructively with respect to an outer shell of the floating body 12. The support surfaces of the receiving region 20 and of the further receiving region 22 are configured to transfer support forces from the carrier structure 14, 14a to the floating body 12 via the form-fit accommodation. In an assembled operation state the support surfaces are partially spaced apart from the carrier structure 14, 14a. The form-fit accommodation of the carrier structure 14, 14a permits, in an assembled operation state, a movement range to the floating body 12. The carrier structure 14, 14a permits a movement by up to 3 mm in a direction parallel to the reference surface normal of the reference side faces 62, 64. Regarding a possible movement of the floating body 12 in a direction parallel to the reference surface normals of the reference upper side 58 or of the reference underside 60, the carrier structure 14, 14a permits the floating body 12 a movement range by up to 10 mm.

The floating body 12 further comprises a total number of eight stack elements 26, 28, which are embodied in such a way that they geometrically correlate with each other and are arranged in such a way that they correlate with each other (see FIG. 4). The four first stack elements 26 are embodied such that they correlate with the four further stack elements 28. Furthermore the four first stack elements 26 are arranged such that they correlate with the four further stack elements 28. The four first stack elements 26 are arranged on the upper side 24 of the floating body 12. The four further stack elements 28 are arranged on the underside 32 of the floating body 12. The stack elements 26, 28 are configured to bring about a lateral form-fit engagement of two floating bodies 12 with each other. A middle axis through center points of the reference upper side 58 and the reference underside 60 is perpendicular both to the reference upper side 58 and to the reference underside 60.

The stack elements 26, with respect to the center point of the reference upper side 58, are arranged to be correlating with the stack elements 28, with respect to the center point of the reference underside 60.

In a projection of the arrangement of the stack elements 26 onto the reference upper side 58 and a projection of the arrangement of the stack elements 28 onto the reference underside 60, the stack elements 26, 28 are arranged to be correlating relative to the shared middle axis of the reference upper side 58 and the reference underside 60.

The stack elements 26, 28 are furthermore implemented integrally with the floating body 12. The stack elements 26, 28 are formed in one piece with the floating body 12. The stack elements 26, 28 and the floating body 12 are formed from one piece. The stack elements 26, 28 and the floating body 12 are produced in a shared production step. Furthermore the stack elements 26, 28 are implemented together with the floating body 12 from one blank. The stack elements 26, 28 are further implemented as a macroscopic structure. The stack elements 26, 28 have a rectangle shape and a flat V-shape. The four stack elements 26 are embodied as deepenings. The four further stack elements 28 are implemented as elevations implemented to be correlating with the deepenings. The deepenings of the stack elements 26 are respectively implemented to be geometrically correlating with the elevations of the further stack elements 28. Starting from the surface of the upper side 24 of the floating body 12, along the direction of the reference surface normal of the reference underside 60, the deepenings of the stack elements 26 have a maximum penetration depth of 16 mm. Starting from the surface of the underside 32 of the floating body 12, in a direction of the reference surface normal of the reference underside 60, the elevations of the further stack elements 28 show a maximum protrusion of 5 mm.

Furthermore the floating body 12 has an anti-skid implementation on its upper side 24. Relative to a smooth surface of the upper side 24 of the floating body 12, the outer surface of the upper side 24 of the floating body 12 has an increased anti-skid implementation in regard to a slip-enhancing substance, e.g. water. In particular, the anti-skid implementation is embodied integrally with the floating body 12. The anti-skid implementation is realized as a profiling. The anti-skid implementation is implemented as a macroscopic structure. The macroscopic structure is implemented as a planar arrangement of elevations. The elevations extend perpendicularly to a plane spanned by a surface of the upper side 24 of the floating body 12. The elevations have a maximum extension of 5 mm perpendicularly to a plane spanned by a surface of the upper side 24 of the floating body 12. The macroscopic structure is implemented of an ellipse-shaped nub structure. The nub structure has a regular pattern (see FIG. 4).

In an assembled operation state the floating body 12 has at least partially a decreasing maximum transverse extension perpendicularly to the ideal water surface 82, along a direction from the upper side 24 to the underside 32 of the floating body 12.

Furthermore, in an operation state when floating and assembled, the floating body 12 is arranged at least partially above the water surface 82. In a state when floating and assembled, the floating body 12 receives the carrier structure 14, 14a of the floating carrier device. In a state when floating and assembled, the upper side 24 of the floating body 12 is situated above the water surface 82. The underside 32 of the floating body 12 is embodied in a curved manner. Furthermore the curved underside 32 is embodied at least partially in a concave manner. The floating body 12 has a decreasing maximum transverse extension in the direction of the reference surface normal of the reference underside 60. The maximum transverse extension of the floating body 12 decreases by approximately 19 cm relative to the maximum transverse extension of the underside 32 of the floating body 12.

The floating body 12 further comprises four side walls 16, 18, which are embodied at least partially as slant surfaces. The side walls 16, 18 of the floating body 12 are embodied differently than the upper side 24 and the underside 32 of the floating body 12. The side walls 16, 18 connect the upper side 24 and the underside 32 of the floating body 12 to one another. The side walls 16, 18 have a curved surface. The side walls 16, 18 furthermore have a surface that is at least partially convexly curved. Main extension planes of the side wall 16, 18 form an angle of approximately 10 degrees relative to an allocated reference side face 62, 64 of the floating body 12. In an assembled operation state, the main extension planes of the side walls 16, 18 furthermore have an angle of approximately 80 degrees relative to the ideal water surface 82.

The four side walls 16, 18 of the floating body 12 are arranged at least substantially in a wedge-shaped fashion to each other. The side walls 16, 18 are embodied to be at least partially curved. Moreover a first main extension plane of a smallest imaginary rectangular cuboid enclosing a first one of the side walls 16, 18 has an angle offset of approximately 20 degrees relative to a second main extension plane of a smallest imaginary rectangular cuboid enclosing a second one of the side walls 16, 18. It is principally also conceivable for the angle offset to be realized smaller or greater. The angle offset may in particular be realized to be greater than 4 degrees and preferably smaller than 40 degrees.

The four side walls 16, 18 of the floating body 12 further comprise two different crimp profiles 30. The crimp profiles 30 are embodied integrally with the floating body 12. The crimp profiles 30 are integrally molded on the floating body 12. The crimp profiles 30 are implemented integrally molded with the floating body 12 by the extrusion blow procedure. Furthermore the crimp profiles 30 and the floating body 12 are formed from one blank.

The crimp profiles 30 are furthermore embodied as deepenings. An arrangement of the crimp profiles 30 is effected on the side wall 16, 18 of the floating body 12. The first crimp profile 30 is implemented to be circulating perpendicularly to a longitudinal axis of the floating body 12. The first crimp profile 30 is realized on the upper side 24, on the underside 32 and on two side walls 16. The first crimp profile 30 is embodied as a groove-shaped deepening. The deepening of the first crimp profile 30 has a penetration depth in the floating body 12 that is analogous to the receiving region 20 and the further receiving region 22. The penetration depth is approximately 30 cm. Furthermore the second crimp profile 30 is embodied as a circle-shaped deepening on the further side wall 18. The second crimp profile 30 has a concave shape.

The crimp profiles 30 advantageously augment a stability of the floating body 12. The crimp profiles 30 are embodied differently than the stack element 26, 28. The crimp profile 30 also differs from the macroscopic anti-skid structure.

The floating body 12 further comprises at least one closure element 34 with a pressure compensation unit. The closure element 34 is configured for checking on the hollow space of the floating body 12. The closure element 34 is also configured for a filling and/or emptying of the floating body 12. The closure element 34 comprises a pressure compensation unit. The pressure compensation unit is configured to bring an inner pressure of the floating body 12 and an ambient pressure in line with each other. The pressure compensation unit is embodied as a pressure compensation valve. The pressure compensation unit is implemented such that it is impermeable for air in at least one operation state. The pressure compensation unit is furthermore implemented to be watertight. The pressure compensation valve is configured to balance an inner pressure of the floating body 12 with an ambient pressure. Alternatively or additionally the floating body 12 comprises a hole for a de-aeration of the hollow space delimited by the floating body 12, which is in particular not shown in the figures.

The carrier structure 14, 14a is configured for a transfer of support forces to a floating body 12 (see FIGS. 3 and 6). The carrier structure 14, 14a is, at least to a large extent, embodied of metal. Here the carrier structure 14, 14a is, at least to a large extent, embodied of steel. The carrier structure 14, 14a is implemented of carrier elements 36, 42, 44. The carrier elements 36, 42, 44 are connected to form the carrier structure 14, 14a. A large portion of the connections between the carrier elements 36, 42, 44 have connection means embodied as rivets. For a connection of carrier elements 36, 44, the connection means are partially embodied as screw connections.

The carrier structure 14, 14a further comprises at least one carrier element 36 that is embodied as a cable guiding unit. The cable guiding unit is implemented as a carrier element 36 that is delimited to three sides. Furthermore the cable guiding unit is embodied as a profiled semi-finished product. The cable guiding unit is also embodied as a combined L and Z profile. For an accommodation of cables the cable guiding unit is implemented such that it is bottomward closed. Beyond this the cable guiding unit has an edge protection element on open edges. The edge protection element is implemented as a bent element of a side wall of the carrier element 36. The edge protection element is configured to protect protruding cables from a cutting edge.

In an assembled operation state the carrier structure 14, 14a comprises seven carrier elements 42, 44, implemented by a hollow profile, in a horizontal plane (see FIG. 6). The hollow profiles are implemented of a semi-finished product. The hollow profiles have an at least substantially rectangular cross section. The carrier elements 42, 44 are furthermore embodied such that they are completely open along a longitudinal axis. An opening 38 along the longitudinal axis of the carrier element 42, 44 is implemented to be contiguously open. The opening 38 is implemented to be water-permeable.

In an assembled operation state the carrier element 36, 42, 44 has the opening 38 in a deepest point. In an assembled operation state the opening 38 is arranged in a deepest point. The opening 38 extends towards the ideal water surface 82 in a direction that is perpendicular to the ideal water surface 82. Furthermore the opening 38 extends downwards in an assembled operation state.

The carrier element 36, 42, 44 is in an assembled operation state arranged above the water surface 82. In an assembled operation state the opening 38 moreover extends in the direction of the earth acceleration.

The carrier element 42 is embodied as a C profile. The carrier element 42 with the C profile is configured, in an assembled operation state, to be received in the receiving region 20 of the side wall 16. The C profile is embodied as a profiled semi-finished product. Furthermore the C profile is embodied as a rectangular profile. The C profile is also embodied such that it is closed on three sides and has the contiguous opening 38 on one side along a longitudinal axis.

The second carrier element 44 is embodied as a hat profile. The hat profile comprises a three-side enclosure and has the opening 38 on an outer side, along a longitudinal axis. Moreover the hat profile comprises webs along the longitudinal axis with the opening 38, said webs being canted outwards. The hat profile has an Omega-shaped cross section.

Further carrier elements 36 are embodied as Z profiles or as combined L and Z profiles.

Furthermore, in an assembled operation state, viewed in a direction from the upper side of the carrier element 42 to a water surface 82, the carrier element 42 having a C profile has at least one downward-extending slant surface 40. The slant surface 40 has an angle offset with respect to a surface of the carrier element 40 that is embodied parallel to the ideal water surface 82. The angle offset has a value of 7 degrees. The slant surface 40 is implemented in a planar fashion. The slant surface 40 of the carrier element 42 is moreover implemented to be at least partially correlating with the support surface of the floating body 12, in particular to an angle of the receiving contour.

For the purpose of a form-fit accommodation of two or four floating bodies 12, the carrier structure 14, 14*a* further comprises four carrier elements 42 that are embodied as longitudinal carrier elements and one carrier element 44 that is embodied as a transverse carrier element (see FIG. 8). The carrier structure 14, 14*a* further comprises two further carrier elements 44 embodied as transverse carrier elements which are configured, analogously to the one carrier element 44 embodied as a transverse carrier element, to transfer a support force to the floating bodies 12. The carrier elements 42 embodied as longitudinal carrier elements are in an assembled operation state arranged along a longitudinal side of the floating body 12. The two carrier elements 42 embodied as longitudinal carrier elements, which are arranged on the floating body 12 in pairs, are furthermore, in an assembled operation state, connected with an L-rail in an end region.

The carrier elements 42 embodied as longitudinal carrier elements are arranged in the receiving regions 20 of the side walls 16. The carrier elements 44 embodied as transverse carrier elements are arranged on the upper side 24 of the floating body 12. The carrier element 44 embodied as a transverse carrier element is arranged in the further receiving region 22 of the upper side 24 of the floating body 12. The carrier elements 42 that are embodied as longitudinal carrier elements are implemented as C profiles. The carrier elements 44 that are embodied as transverse carrier elements are implemented as hat profiles. Respectively two carrier elements 42 embodied as longitudinal carrier elements and one carrier element 44 embodied as a transverse carrier element are section-wise configured to receive a floating body 12 in a form-fit manner. Herein the carrier elements 42 embodied as longitudinal carrier elements and the carrier elements 44 embodied as transverse carrier elements are implemented to be riveted with one another. The carrier elements 44 embodied as transverse carrier elements are arranged above the carrier elements 42 embodied as longitudinal carrier elements. On the carrier structure 14, which is configured to accommodate the energy conversion unit 52 with twelve solar elements 10 which are embodied as photovoltaic modules, respectively one rafter element is arranged above each of the three carrier elements 44 of the carrier structure 14 that are embodied as transverse carrier elements (see FIG. 7). The three rafter elements are implemented in a saddle roof shape. The rafter elements are furthermore implemented as closed hollow profiles. The rafter elements further comprise a screw connection with the carrier elements 44 that are embodied as transverse carrier elements. The rafter elements span a roof pitch angle of 12 degrees. It is generally conceivable that the rafter elements span a roof pitch angle in a range between 9 degrees and 16 degrees. On the upper side of the rafter elements, four purlin elements are implemented to be parallel to the carrier elements 42 embodied as longitudinal carrier elements. On one saddle roof side, respectively two differing purlin elements have rivet connections with the rafter elements. A first purlin element is embodied as a Z profile, a second purlin element is embodied as a cable guiding unit. The cable guiding unit is arranged closer to a roof ridge than the Z profile. Furthermore four wind bracing elements forming a wind bracing unit are configured for a reinforcement of the saddle roof structure. The wind bracing elements are arranged on an underside of the rafter elements. The wind bracing unit is implemented in an X-shape. The floating units 48*a* with an increased expected wind pressure comprise the wind bracing unit, in particular the increased expected wind pressure is situated in peripheral regions of the energy conversion system 6. A highest point of the purlin elements, in particular the roof ridge region, is arranged decentrally relative to the floating bodies 12, respectively to a longitudinal axis of the floating unit 48*a*. The carrier structure 14 is configured to accommodate the solar elements 10 in such a way that two of the four floating bodies 12 are overlapped by solar elements 10. The two other floating bodies 12 are free of an overlap by solar elements 10. The two other floating bodies 12 are furthermore implemented as a walkway. In a region between the two other floating bodies 12 and between the carrier elements 42 that are embodied as longitudinal carrier elements, two panels are arranged. The panels are configured to form a walkway. The panels are mounted above the carrier elements 42 that are embodied as longitudinal carrier elements.

The carrier structure 14*a*, which is configured to accommodate the power converter device 50, comprises four carrier elements 42 embodied as longitudinal carrier elements, wherein respectively two of the carrier elements 42 embodied as longitudinal carrier elements are configured to accommodate respectively one of the floating bodies 12 in a form-fit, floating fashion. The carrier elements 42 that are embodied as longitudinal carrier elements and are arranged in pairs are connected by means of three carrier elements 44 embodied as transverse carrier elements. Two U profiles are arranged parallel to the carrier elements 42 that are embodied as longitudinal carrier elements and below the carrier elements 44 that are embodied as transverse carrier elements, and are connected to the carrier elements 44 that are embodied as transverse carrier elements. The power converter device 50 is arranged on the carrier structure 14*a*, centrally between the two floating bodies 12. On the carrier structure 14*a* separate cable guiding units for AC and DC lines are arranged next to the power converter device 50. Furthermore gratings are arranged on the carrier structure 14*a* which form a walkway, in particular by the further alleyways 92.

The carrier structure 14, 14*a* is also configured to receive at least one floating body 12 such that it is supported in a floating fashion (see FIG. 8). The floating support of the floating body 12 in the carrier structure 14, 14*a* permits a movement range and/or expansion range of the floating body 12 that is delimited by the receiving region 20 and the further receiving region 22. The floating body 12 being received in the carrier structure 14, 14*a* is brought about without additional connection means. This especially advantageously allows doing without making use of fixation means entering the floating body 12. The receiving contours of the receiving region 20 and of the further receiving region 22 are configured for a centering receiving of the floating body 12. In an assembled operation state, the carrier elements 42 embodied as longitudinal carrier elements and the carrier elements 44 embodied as transverse carrier elements delimit an at least substantially perpendicular movement of the floating body 12 relative to the ideal water surface 82.

Furthermore, in an assembled operation state, the carrier elements 42 embodied as longitudinal carrier elements and the carrier elements 44 embodied as transverse elements delimit an at least substantially parallel movement of the floating body 12 relative to the ideal water surface 82. In an assembled operation state, the carrier structure 14, 14a permits the floating body 12 a movement range and/or expansion range of 10 mm, along a direction oriented at least substantially perpendicularly to the water surface 82. The floating support of the floating body 12 in the carrier structure 14, 14a is configured for receiving and/or supporting the floating body 12 with a spacing of maximally 3 mm from the receiving region 20 and/or the further receiving region 22, in a vertical direction that is parallel to the reference surface normal of the reference side surface 62, 64.

The carrier structure 14 is furthermore implemented as a roof structure (see FIGS. 2 and 7). The roof structure comprises mounting surfaces which are configured to receive twelve solar elements 10. The roof structure is particularly preferably implemented for an accommodation of eighteen solar elements 10. The roof structure is furthermore embodied as a saddle roof structure. The purlin elements span the mounting surface together with the carrier elements 36. The solar elements 10 are arranged on an upper side of the purlin elements. The saddle roof structure is configured for an east-west orientation of the mounting surfaces.

Furthermore a solar device comprises the floating carrier device 8 with twelve solar elements 10. The solar device has a saddle roof structure configured to receive six solar elements 10 on each side of the saddle roof structure. In an assembled operation state respectively two directly neighboring solar elements 10, each of the two solar elements 10 being arranged on its own saddle roof side, form an air circulation opening 46 in a highest point. The air circulation opening 46 is arranged in a roof ridge region of the roof structure. The roof ridge region is implemented as an interruption-free continuous opening. The air circulation opening 46 is embodied as a spacing in the roof ridge region between directly neighboring solar elements 10 which are arranged facing away from one another. The spacing is 26 mm. The air circulation opening 46 between the spaced-apart solar elements 10 is completely free of structural components. The air circulation opening 46 is configured for conveying away a vertical air flow that is due to convection, preferably from the roof structure.

The energy conversion system 6 further comprises a connection device 66. The connection device 66 connects nine floating units 48a, which are embodied as a floating carrier device in a rigid manner to form a raft unit 68, and connects a plurality of raft units 68 to one another in a movable manner. It is also conceivable that the connection device 66 connects more or less than nine floating units 48a to one another to form a raft unit 68.

It is further conceivable that the connection device 66 is configured to connect the floating units 48a to one another in a partly movable manner to form a raft unit 68.

The carrier elements 42 embodied as longitudinal carrier elements and the carrier elements 44 embodied as transverse carrier elements have a connection region on both front regions. The connection region is configured for an accommodation of a connection device 66. The connection region further comprises a fixation means receiving region for an accommodation of fixation means. The fixation means receiving region has two round openings on each front side.

The raft unit 68 is furthermore embodied as a 3×3 array with nine rigidly connected floating units 48a (see FIGS. 1a and 1b). It is moreover conceivable for the raft unit 68 to be implemented of more or less than nine floating units 48a. It is also conceivable for the floating units 48a to be connected to one another in a partly movable manner. The floating units 48a are arranged in a rectangle array.

Furthermore the raft units 68 are connected to each other in a completely movable manner by means of the connection device 66. It is also conceivable that the raft units 68 are connected to each other in a partly rigid manner by means of the connection device 66.

The connection device 66 partially has a connection with the carrier structure 14, 14a. In an assembled operation state the connection device 66 is arranged on the open front sides of the carrier elements 42 that are embodied as longitudinal carrier elements and of the carrier elements 44 that are embodied as transverse carrier elements. The connection device 66 is configured to be connected, partly via screw connections and partly via rivet connections, to the carrier elements 42 embodied as longitudinal carrier elements and to the carrier elements 44 embodied as transverse carrier elements.

In a pre-assembled state the connection device 66 comprises at least one connection unit that is embodied as a foldable connection unit. The connection device 66 is in the pre-assembled state configured to be connected, by one of two provided screw connections, to the connection region of the carrier element 42 that is embodied as a longitudinal carrier element or of the carrier element 44 that is embodied as a transverse carrier element. The carrier element 42 that is embodied as a longitudinal carrier element and the carrier element 44 that is embodied as a transverse carrier element each comprise respectively one receiving opening on their front sides, which is implemented to be correlating with a width of the connection device 66. In this way it is possible, in a pre-assembled state, for the connection device 66 to be folded on a partial circle around an axle of the one mounted screw connection. The receiving opening is configured to receive a longitudinal axle of the connection device 66 in an at least substantially perpendicular position. The foldable connection device 66 is configured to be folded from a pre-assembled state into an assembled operation state. Further a longitudinal axle of the foldable connection device 66 is folded from a position extending perpendicularly to the ideal water surface 82 into a position of an assembled operation state.

Beyond this the connection device 66 comprises at least one damper unit 70. In an assembled operation state the damper unit 70 is realized between the connection device 66 and a connection region of one of the carrier elements 42 embodied as longitudinal carrier elements or of the carrier elements 44 embodied as transverse carrier elements. The damper unit 70 is embodied as a spring-elastic element. The damper unit 70 is furthermore embodied as a macroscopic element. The damper unit 70 has at least one extension that is elastically modifiable by 10% in an assembled operation state. The damper unit 70 furthermore generates a counter-force acting counter to the modification, which is dependent on the modification of the extension, and is preferably proportional to the modification. The damper unit 70 further comprises a rubber damper element. The damper unit 70 has a rectangle geometry.

The connection device 66 further comprises a movable connection unit 72 (see FIG. 9). In an assembled operation state the movable connection unit 72 comprises two connection elements 74, 76, which are connected with each other in a pivotable manner. The connection elements 74, 76 share a pivot axis. The pivot axis is implemented by a threaded bolt. The bolt is furthermore embodied as a plug bolt. The connection elements 74, 76 further comprise respectively two pass-through openings for connection means. The connection means is embodied as a plug bolt having a securing element.

Beyond this the connection device 66 comprises a hollow profile. The hollow profile of the connection device 66 has, in at least one front region, a reduced cross section, in particular relative to the cross section of the hollow profile. In a pre-assembled state of the connection device 66, the reduced cross section in the front region is configured for folding off, without resistance, at least one portion of the connection device 66 into the corresponding receiving opening on the carrier element 42 that is embodied as a longitudinal carrier element or on the carrier element 44 that is embodied as a transverse carrier element. Starting from the front region of the hollow profile, the reduced cross section has an at least substantially wedge-shaped profile, which is implemented with a step in a longitudinal direction of the hollow profile. Furthermore end regions of the wedge-shaped profile are embodied in a rounded manner.

The first connection element 74 is implemented as a rectangular hollow profile with a support opening along a longitudinal axis. The hollow profile is implemented in a square shape with an edge length of 40 mm×40 mm. The support opening is configured to movably receive the second connection element 76. The support opening is realized as a recess along a longitudinal axis of the hollow profile. The recess extends through two side faces of the hollow profile which extend at least substantially parallel to each other. The first connection element 74 and the second connection element 76 are configured to be received on the open front region of the carrier element 42 that is embodied as a longitudinal carrier element or of the carrier element 44 that is embodied as a transverse carrier element. The second connection element 76 is realized as a combination of a flat material and a hollow profile. The hollow profiles of the first and second connection elements 74, 76 each have respectively two pass-through openings in the connection regions, for the purpose of receiving connection means. The connection means are embodied as plug bolts respectively having a securing element. The flat material is implemented such that it is welded with the one hollow profile of the second connection element 76. In an assembled operation state the flat material of the second connection element 76 is configured such that it is received in the receiving opening of the first connection element 74 and is movable around the shared pivot axis. The flat material of the second connection element 76 has a radius in a front region. The radius is configured such that the second connection element 76 is implemented to be pivotable without resistance in the receiving opening of the first connection element 74. In an assembled operation state the movable connection unit 72 is configured to permit a pivot movement in a plane that is perpendicular to the ideal water surface 82. It is furthermore possible for the movable connection unit 72 to be implemented in such a way that it is movably supported in the connection region via the connection means.

Further a rigid connection unit 78 is implemented by a hollow profile (see FIG. 10). The hollow profile has the measurements 40 mm×40 mm. The rigid connection unit 78 comprises in total four pass-through openings for connection means. It is also conceivable that the rigid connection unit 78 comprises a plurality of pass-through openings. The connection means are embodied as plug bolts having a securing element. The hollow profile of the rigid connection unit 78 has a reduced cross section in both front regions. The reduced cross section is realized perpendicularly to the longitudinal axis of the rigid connection unit 78. Starting from the front region of the hollow profile, the reduced cross section has an at least substantially wedge-shaped profile, which is implemented with a step in the longitudinal direction of the hollow profile. Furthermore the end regions of the hollow profile are embodied in a rounded manner.

Furthermore the connection device 66, with the exception of the damper unit 70, is embodied entirely of steel.

Beyond this, from a length of approximately 130 m, an array of raft units 68 is encompassed by a wave-breaker device 80 of the energy conversion system 6 (see also FIG. 11). The wave-breaker device 80 is implemented as a plurality of floating bodies 12, which are connected via longitudinal carrier elements 42 and movable connection units 72. In an assembled operation state, as part of the wave-breaker device 80, the floating bodies 12 have water as ballast inside their hollow spaces. The wave-breaker device 80 further comprises a movable connection with the raft units 68. In an assembled operation state the wave-breaker device 80 is connected to the raft units 68 of the energy conversion system 6 by way of movable connection units 72 (see FIG. 1). It is conceivable for the energy conversion system 6, in particular the floating carrier devices 8, 9 and/or the floating units 48a, 48b, to comprise at least one bird-deterrent unit that is configured to prevent birds from nesting and/or from stopping on the energy conversion system 6. In particular, the bird-deterrent unit is not shown in the figures. The bird-deterrent unit comprises, for example, a plurality of wires, barbs and/or projections, which are arranged on surfaces of the energy conversion system 6, in particular of the floating carrier units 8, 9 and/or of the floating units 48a, 48b. It is also conceivable that the bird-deterrent unit is arranged at least partially on the wave-breaker device 80.

The arrangement of the energy conversion system 6 moreover comprises, following a sequence of twelve row-wise adjacent floating carrier devices 8 loaded with solar elements 10, a further floating carrier device 9 with the power converter device 50, followed by another sequence of twelve row-wise adjacent floating carrier devices 8 loaded with solar elements 10 (see FIG. 2). The floating carrier devices 9 with the respectively one power converter device 50 form, in particular by the further alleyways 92, a walkway that is perpendicular to the walkways, which are in particular formed by the alleyways 88, of the floating carrier devices 8 with the solar elements 10.

FIG. 11 shows a portion of an energy conversion system 122 with a stabilization device 116. The stabilization device 116 is arranged on a floating unit 118 of the energy conversion system 122 below an, in particular ideal, water surface 82 of the water body. The stabilization device 116 is configured to apply, at least onto the floating unit 118, a counterforce to a movement of the floating unit 118 relative to the water surface 82 wherein, in at least one operation state, the stabilization device 116 has a greater maximum distance 120 from the, in particular ideal, water surface 82 than the floating unit 118, in particular than a floating body 102 of the floating unit 118. The stabilization device 116 is fixated, in particular at least substantially non-releasably, in particular via a rivet connection, on a floating body 102 of the floating unit 118, on the connection device 66 and/or on a carrier structure 104 of the energy conversion system 122. It is also conceivable that the stabilization device 116 is fixated on the floating body 102 of the floating unit 118, on the connection device 66 and/or on the carrier structure 104 via a screw connection or the like.

The stabilization device 116 comprises a plurality of, in particular three, stabilization elements 124 for a cooperation with a fluid of the water body, and comprises at least one bracing unit 126 for an, in particular at least substantially tolerance-free, arrangement of the stabilization elements 124. The stabilization elements 124 are arranged on an underside of the energy conversion system 122, in particular of the floating unit 118. In particular in a floating state of the energy conversion system 122, in particular of the floating unit 118, the stabilization elements 124 are arranged below the water surface 82. The bracing unit 126 comprises a plurality of bracing elements 128, which connect the stabilization elements 124 with the floating body 102 of the floating unit 118, with the connection device 66 and/or with the carrier structure 104. The stabilization elements 124 are arranged at least substantially parallel to the, in particular ideal, water surface 82. In particular, a main extension axis of the stabilization elements 124 extends at least substantially parallel to the, in particular ideal, water surface 82. The stabilization device 116 comprises two further stabilization elements 130, which are respectively arranged on the bracing elements 128. In particular, the further stabilization elements 130 extend between two bracing elements 128 of the bracing unit 126, which in particular extend at least substantially perpendicularly to the water surface 82.

The stabilization device 116, in particular the stabilization elements 124, comprises/comprise force transfer areas 132 for a cooperation with a fluid of the water body which, in particular in at least one operation state, are arranged, at least to a large extent, at least substantially parallel to an ideal water surface 82.

The stabilization device 116, in particular the further stabilization elements 130, comprises transverse force transfer areas 134 for a cooperation with a fluid of the water body which, in particular in at least one operation state, are arranged, at least to a large extent, at least substantially perpendicularly to an ideal water surface 82. The stabilization elements 124 form the force transfer areas 132. The further stabilization elements 130 form the transverse force transfer areas 134. The stabilization elements 124 are each embodied at least substantially panel-shaped. The further stabilization elements 130 are each embodied at least substantially panel-shaped. The stabilization elements 124 respectively form two force transfer areas 132, which are arranged on sides of the respective stabilization element 124 that face away from each other. The further stabilization elements 130 respectively form two transverse force transfer areas 134, which are arranged on sides of the respective further stabilization element 130 that face away from each other. The force transfer areas 132 and/or the transverse force transfer areas 134 are respectively embodied having at least largely planar surfaces. One of the stabilization elements 124 is arranged, in particular viewed along a direction that is oriented at least substantially perpendicular to the water surface 82, between the two further stabilization elements 130 and/or between the bracing elements 128. Two other stabilization elements 124 are respectively arranged on one of the further stabilization elements 130 and/or on two of the bracing elements 128. The two other stabilization elements 124 in particular form projections respectively extending away from the bracing unit 126, in particular the bracing elements 128. The stabilization elements 124 are embodied as panels, which are connected to one another via a strut system. The bracing elements 128 of the bracing unit 126 are embodied as rod-shaped struts, which in particular the stabilization elements 124 and the further stabilization elements 130 are fixated to. Preferably the stabilization elements 124 and/or the further stabilization elements 130 are fixated on the carrier structure 104 of the floating unit 118 by means of the bracing unit 126, in particular the bracing elements 128. The bracing unit 126 comprises, in particular four, further bracing elements 136, which in particular support the bracing elements 128 against a movement towards each other, in a direction that is oriented at least substantially parallel to the water surface 82. The further bracing elements 136 are arranged respectively cross-wise with another further bracing element 136. In particular, respectively two of the bracing elements 128 are implemented integrally with one of the further stabilization elements 130. It is however also conceivable that the bracing elements 128 and the further stabilization elements 130 are implemented separately and/or are arranged, in particular fixated, to each other. Preferably the cross-wise arranged further bracing elements 136 are fixated to each other and/or supported rotatably to each other in a contact region, in particular a middle region that is arranged around a geometrical center of the further bracing element 136. Preferentially each of the further bracing elements 136 is arranged with one end on one of the bracing elements 128. It is however also conceivable that the further bracing elements 136 are arranged with one end on the carrier structure 104. It is also conceivable for the stabilization device 116, in particular the bracing unit 126, to be arranged, in particular fixated, on a wave-breaker device 80 of the energy conversion system 122, which is in particular arranged on the floating unit 118 and/or on the carrier structure 104. However, other implementations of the stabilization device 116, in particular of the stabilization elements 124, the further stabilization elements 130 and/or the bracing unit 126, are also conceivable.

In at least one operation state the stabilization device 116 has in a perpendicular direction a maximum distance 138 from the floating unit 118 that is at least 50 cm, preferably at least 100 cm, preferentially at least 150 cm and particularly preferably at least 180 cm. In particular, the maximum distance 138 of the stabilization device 116, in particular the stabilization elements 124, from the floating unit 118 is maximally 400 cm, preferably no more than 300 cm and preferentially no more than 250 cm. The maximum distance 138 of the stabilization device 116, in particular the stabilization elements 124, from the floating unit 118 extends at least substantially perpendicularly to the ideal water surface 82. In particular, a minimum distance 140 of the stabilization device 116, in particular the stabilization elements 124, from the floating unit 118, in particular from an underside and/or a bottom of the floating unit 118, in particular from a floating body 102 of the floating unit 118, is at least 40 cm, preferentially at least 80 cm, preferably at least 120 cm and particularly preferably at least 160 cm. The bracing elements 128 of the bracing unit 126, in particular at least one of the bracing elements 128 of the bracing unit 126, preferably have/has a maximum longitudinal extension 142 of at least 150 cm, preferentially at least 170 cm and especially preferentially at least 190 cm. The bracing elements 128 of the bracing unit 126 are preferably arranged, in particular fixated, with one end on the connection device 66 and/or on the carrier structure 104. The bracing elements 128 of the bracing unit 126 are preferably arranged, in particular fixated, with another end that faces away from the one end, on one of the stabilization elements 124.

The force transfer areas 132, in particular a total of all force transfer areas 132 of the stabilization elements 124, are at least 2,500 cm$^2$, preferably at least 5,000 cm$^2$, preferentially at least 7,500 cm$^2$ and especially preferentially at least 10.000 cm². The transverse force transfer areas 134, in particular a total of all transverse force transfer areas 134 of the further stabilization elements 130, are at least 1,000 cm², preferentially at least 2,000 cm² and preferably at least 3,000 cm². In particular, the force transfer areas 132, in particular the total of all force transfer areas 132 of the stabilization elements 124, are maximally 30,000 cm², preferentially no more than 25,000 cm² and preferably maximally 20,000 cm². Main extension planes of the individual force transfer areas 132 respectively extend at least substantially parallel to the ideal water surface 82. In particular, the stabilization elements 124 each comprise a further force transfer area 132, which is in particular arranged on a side of the stabilization element 124 that faces away from a force transfer area 132. Particularly preferably the force transfer area 132 is arranged on a side of the stabilization device 116, in particular the stabilization element 124, that faces towards the ideal water surface 82. Preferably the further force transfer area 132 is arranged on a side of the stabilization device 116, in particular the stabilization element 124, that faces away from the ideal water surface 82. Preferentially the force transfer area 132 and the further force transfer area 132 are embodied to be congruent. It is however also conceivable that the force transfer area 132 and the further force transfer area 132 are embodied differently. A main extension plane of the further force transfer area 132 preferentially extends at least substantially parallel to the ideal water surface 82. It is conceivable for the stabilization device 116 to comprise a plurality of stabilization elements 124, which in particular together form a force transfer area 132 and a further force transfer area 132. A size of the force transfer area 132 and/or the further force transfer area 132 is implemented to be adjustable, in particular by a modular removal or addition of individual stabilization elements 124. For example, the counterforce acting onto the floating unit 118 may be adapted via the force transfer areas 132 in an application-specific and/or environment-specific manner, depending on a weight of the energy conversion system 122, in particular of the floating unit 118, and/or on a swell/on wind waves of the water body.

In FIGS. 12a, 12b and 12c an alternative implementation of a floating body 102 of a floating carrier device 100 and/or of a floating unit 118 is illustrated. As the floating body 102 shown in FIGS. 12a, 12b and 12c has an at least substantially analogous implementation to the floating bodies 12 described in the description of FIGS. 1 to 10, the description of FIGS. 1 to 10 may at least substantially be referred to regarding an implementation of the floating body 102 shown in FIGS. 12a, 12b and 12c. Differently than the floating bodies 12 described in the description of FIGS. 1 to 10, the floating body 102 shown in FIGS. 12a, 12b and 12c preferably has a maximum longitudinal extension 144 of more than 180 cm, preferentially more than 200 cm, preferably more than 220 cm and particularly preferably at least substantially 224 cm. In particular, the maximum longitudinal extension 144 of the floating body 102 extends at least substantially parallel to a main extension axis 146 of the floating body 102, said main extension axis 146 being oriented, in particular in a state when arranged on the water body, at least substantially parallel to the ideal water surface 82. A maximum transverse extension 148 of the floating body 102 is preferentially implemented identically to a maximum transverse extension of the floating body 12 described in FIGS. 1 to 10. The maximum transverse extension 148 of the floating body 102 preferably is at least 50 cm, preferentially at least 55 cm, preferably at least 60 cm and very particularly preferably at least substantially 60 cm. In particular, the maximum transverse extension 148 of the floating body 102 is oriented at least substantially perpendicularly to the maximum longitudinal extension 144 of the floating body 102 and is, in particular in a state when arranged on the water body, oriented at least substantially parallel to the ideal water surface 82. The floating body 102 delimits a hollow space 150, in particular precisely one hollow space 150, which has a maximum volume of more than 400 liters, preferably more than 500 liters, preferentially more than 700 liters, particularly preferably more than 720 liters and very preferentially at least substantially 730 liters. Preferably the maximum volume of the hollow space 150 of the floating body 102 is realized by precisely one recess that is delimited by the floating body 102. The floating body 102 preferentially has a maximum outer surface 152 comprising in particular receiving regions 20, 22, stack elements 26, 28, side walls 16, 18 and/or crimp profiles 30 of the floating body 102. In particular, the maximum outer surface 152 of the floating body 102 is at least 3 m², preferentially at least 5 m² and preferably at least 6 m². Preferentially the floating body 102 has a maximum weight of no more than 50 kg, preferably no more than 35 kg, preferentially no more than 32 kg, particularly preferably no more than 30 kg and very particularly preferably no more than 25 kg. In particular, the maximum weight of the floating body 102 is at least 10 kg, preferentially at least 15 kg and preferably at least 20 kg. The floating body 102 preferentially has an average wall thickness 154 of at least 4 mm, preferentially at least 5 mm and especially preferentially at least 5.5 mm. Preferably the average wall thickness 154 of the floating body 102 is maximally 10 mm, preferentially maximally 9 mm and preferably no more than 7 cm. It is conceivable that, at least in a region of the receiving regions 20, 22, the floating body 102 has at least partly a greater wall thickness than in regions that differ from the receiving regions 20, 22.

The floating body 102 comprises on an upper side of the floating body 102 three receiving regions 22, 158 for the carrier structure 104, in particular for the purpose of receiving the carrier structure 104 at least partly. The three receiving regions 22, 158 extend at least substantially completely over the maximum transverse extension 148 of the floating body 102. Viewed along the maximum longitudinal extension 144 and/or the main extension axis 146 of the floating body 102, one receiving region 22 of the three receiving regions 22, 158 is arranged centrally on the floating body 102. The receiving region 22 of the three receiving regions 22, 158 is shown in particular in FIG. 12c in a cross section. In particular, the receiving region 22 is configured to receive at least one carrier element 36 and/or a bracing element 108 of the carrier structure 104 at least in a form-fit manner, wherein in particular the carrier element 36 and/or the bracing element 108 of the carrier structure 104 adjoins the floating body 102, in particular in an assembled state. The floating body 102 preferentially forms a projection 156 within the receiving region 22 of the three receiving regions 22, 158, wherein in particular the carrier element 36 and/or the bracing element 108 of the carrier structure 104 are/is configured, when the carrier structure 104 is supported on the floating body 102, to receive the projection 156 at least partly, in particular at least to a large extent. Preferentially the projection 156 and the carrier element 36 and/or the bracing element 108 of the carrier structure 104 are/is configured for a holding and/or securing of the carrier structure 104 against a movement of the floating body 102 and/or of the carrier structure 104 in a direction that is oriented at least substantially parallel to the maximum longitudinal extension 144 and/or to the main extension axis 146 of the floating body 102. Viewed along the maximum longitudinal extension 144 and/or the main extension axis 146 of the floating body 102, two receiving regions 158 of the three receiving regions 22, 158 are arranged each on one end of the floating body 102 respectively. In particular, the two receiving regions 158 of the three receiving regions 22, 158 are arranged on two ends of the floating body 102 that face away from each other. The two receiving regions 158 of the three receiving regions 22, 158 are in particular configured to receive two carrier elements 36 and/or two bracing elements 108 of the carrier structure 104. The two receiving regions 108 of the three receiving regions 22, 158 and/or the two carrier elements 36 and/or the two bracing elements 108 of the carrier structure 104 are preferably configured for tensioning the floating body 102 on the carrier structure 104 in a direction that is oriented at least substantially parallel to the maximum longitudinal extension 144 and/or to the main extension axis 146 of the floating body 102, and/or for securing and/or holding the floating body 102 against a movement relative to the carrier structure 104 in the direction that is oriented at least substantially parallel to the maximum longitudinal extension 144 and/or to the main extension axis 146 of the floating body 102. The floating body 102 comprises two further receiving regions 20, which are respectively arranged on a side wall 16, 18 of the floating body 102. The two further receiving regions 20 extend at least substantially parallel to the maximum longitudinal extension 144 and/or the main extension axis 146 of the floating body 102. The two further receiving regions 20 are configured to at least partly receive the carrier structure 104, in particular a carrier element 36 and/or a bracing element 108 of the carrier structure 104. Preferentially a minimum distance 160 of the two further receiving regions 20 from an underside 32 of the floating body 102 extends by at least 30 cm, preferably at least 35 cm and particularly preferably at least 40 cm. The two further receiving regions 20 are preferably configured, by way of a cooperation with the carrier structure 104, for a holding and/or securing of the floating body 102 against a movement relative to the carrier structure 104 in a direction that is oriented at least substantially perpendicularly to the maximum longitudinal extension 144 and/or to the main extension axis 146 of the floating body 102. Preferentially the two further receiving regions 20 are delimited in a direction towards an upper side 24 of the floating body 102 at least partly, in particular at least to a large extent, by a wall of the floating body 102. Preferably the two further receiving regions 20 are configured for a holding and/or securing of the floating body 102, via cooperation with the carrier structure 104, against a movement relative to the carrier structure 104 in a direction that is oriented from the underside 32 of the floating body 102 to the upper side 24 of the floating body 102.

However, implementations of the floating body 102, having on the upper side 24 a number of receiving regions 22, 158 that differs from three, are also conceivable, for example only having a receiving region 22 that is arranged centrally on the upper side 24 of the floating body 24.

FIG. 13 shows an alternative implementation of a solar device 98, comprising a floating carrier device 100 and a plurality of, in particular eighteen, solar elements 10. The floating carrier device 100 comprises four floating bodies 102, which in particular respectively correspond to the floating body 102 described regarding FIGS. 12a, 12b and 12c. The floating carrier device 100 comprises a carrier structure 104, which is coupled with the floating bodies 102 and which is in particular configured for a support of the solar elements 10 on the floating bodies 102. Alternatively it is conceivable that the floating carrier device 100 comprises a number of floating bodies 102 that differs from four, preferably at least three. Alternatively or additionally it is conceivable that the floating carrier device 100 is configured to receive a number of solar elements 10 differing from eighteen. The floating carrier device 100 depicted in FIG. 13 has an implementation that is at least substantially analogous to the floating carrier device 8 described in the description of FIGS. 1 to 10, and therefore the description of FIGS. 1 to 10 may at least substantially be referred to in regard to an implementation of the floating carrier device 100 shown in FIG. 13. Differently than the floating carrier device 8 described in the description of FIGS. 1 to 10, the floating carrier device 100, in particular the carrier structure 104, shown in FIG. 13 preferably has a greater maximum longitudinal extension 162. In particular, the maximum longitudinal extension 162 of the floating carrier device 100, in particular of the carrier structure 104, is oriented at least substantially parallel to a main extension axis 164 of the floating carrier device 100, in particular the carrier structure 104, which is in particular oriented at least substantially parallel to an ideal water surface 82.

The solar elements 10, in particular in an arrangement on the floating carrier device 100, together have a maximum longitudinal extension 166 of at least 4 m, preferably at least 6 m, preferentially at least 8 m and particularly preferably at least 9 m. Preferably, in an assembled state of the solar device 98 and/or in a state of the solar elements 10 being arranged on the carrier structure 104, the maximum longitudinal extension 166 of the solar elements 10 is oriented at least substantially parallel to the maximum longitudinal extension 170 of the carrier structure 104, in particular of a bracing element 136 of the carrier structure 104, and/or oriented parallel to the floating carrier device 100, in particular to the main extension axis 164 of the floating carrier device 100. In a state when arranged on the carrier structure 104, the solar elements 10 are preferably arranged along the maximum longitudinal extension 166 of the solar elements 10 in two rows 168, which are in particular arranged at least substantially parallel to one another. Especially preferentially the maximum longitudinal extension 166 of the solar elements 10 is to be understood as a maximum longitudinal extension 166 of all solar elements 10 of the solar device 98 in a state when arranged on the carrier structure 104, and is in particular realized differently from a maximum longitudinal extension of the individual solar elements 10. Preferably, in the assembled state of the solar device 98 and/or in the state when the solar elements 10 are arranged on the carrier structure 104, the carrier structure 104, in particular the at least one bracing element 136, extends over the maximum longitudinal extension 166 of the solar elements 10 at least to a large extent, in particular at least substantially completely, wherein in particular the solar elements 10, in particular a row 168 of the solar elements 10, are/is arranged, in particular fixated, on the bracing element 136.

The carrier structure 104 has a maximum longitudinal extension 170 of at least 4 m, preferentially at least 6 m, preferably at least 8 m and particularly preferably at least 9 m.

Preferably the maximum longitudinal extension 170 of the carrier structure 104 is at least substantially parallel to the main extension axis 164 of the floating carrier device 100, in particular of the carrier structure 104, and/or the maximum longitudinal extension 170 of the carrier structure 104 is oriented at least substantially parallel to the ideal water surface 82, in particular in a floating state of the floating carrier device 100. Preferably, viewed in at least one plane, in particular a plane that is oriented at least substantially parallel to a main extension plane of the floating carrier device 100, in particular of the carrier structure 104, and/or oriented, in particular in a floating state of the floating carrier device 100, at least substantially parallel to the ideal water surface 82, the floating carrier device 100, in particular the carrier structure 104, has an at least substantially rectangular basic shape, wherein in particular the maximum longitudinal extension 170 of the carrier structure 104 extends along a longest side of the basic shape. In particular, the maximum longitudinal extension 170 of the carrier structure 104 is maximally 20 m, preferentially maximally 15 m and preferably no more than 10 m. The maximum longitudinal extension 170 of the carrier structure 104 preferentially extends at least to a large extent, in particular at least substantially completely, over a maximum longitudinal extension 162 of the floating carrier device 100. The carrier structure 104 has a maximum transverse extension 172 of at least 3 m, preferably at least 4 m and preferentially at least 4.5 m. The maximum transverse extension 172 of the carrier structure 104 is preferably oriented at least substantially parallel to the main extension plane of the floating carrier device 100, in particular of the carrier structure 104, and/or is oriented at least substantially parallel to the ideal water surface 82, in particular in a floating state of the floating carrier device 100. In particular, the maximum transverse extension 172 of the carrier structure 104 is oriented at least substantially perpendicularly to the maximum longitudinal extension 170 of the carrier structure 104. Preferentially, viewed in at least one plane, in particular in a plane that is oriented at least substantially parallel to the main extension plane of the floating carrier device 100, in particular of the carrier structure 104, and/or is oriented, in particular in a floating state of the floating carrier device 100, at least substantially parallel to the ideal water surface 82, the floating carrier device 100, in particular the carrier structure 104, has an at least substantially rectangular basic shape, wherein in particular the maximum transverse extension 172 of the carrier structure 104 extends along a side of the basis shape that is in particular implemented differently from the longest side of the basic shape. In particular, the maximum transverse extension 172 of the carrier structure 104 is maximally 20 m, preferably maximally 15 m and preferentially maximally 10 m. Preferably the maximum transverse extension 172 of the carrier structure 104 extends at least to a large extent, in particular at least substantially completely, over a maximum transverse extension of the floating carrier device 100.

The carrier structure 104 comprises four bracing elements 136, which are configured for a support of the plurality of solar elements 10 along the maximum longitudinal extension 170 of the carrier structure 104, wherein the bracing elements 136 each have a maximum longitudinal extension 174 of at least 4 m, preferably at least 6 m, preferentially at least 8 m and particularly preferably at least 9 m. Preferably the bracing elements 136, in particular the maximum longitudinal extension 174 of the bracing elements 136, extend at least substantially parallel to the maximum longitudinal extension 170 of the carrier structure 104. In particular, the bracing elements 136 are respectively embodied as a strut with a hollow profile and with an opening that extends along the maximum longitudinal extension 174 of the bracing elements 136 and is in particular located on an underside of the respective bracing element 136. However, other implementations of the bracing elements 136 are also conceivable, for example as rails, as beams, as bars, or the like. It is conceivable that, in particular viewed in a section plane that is oriented at least substantially perpendicularly to the maximum longitudinal extension 174 of the bracing elements 136, the bracing elements 136 are embodied structurally identical and/or identical to a carrier element 36, in particular to the carrier elements 36 of the carrier structure 14 shown in FIGS. 1 to 10. It is in particular conceivable that the bracing elements 136 are respectively embodied as a C profile, that they are embodied at least partially open when viewed along the maximum longitudinal extension 174 of the bracing elements 136, and/or that in an assembled operation state, when viewed in a direction from an upper side of the bracing elements 136 towards the water surface 82, they have at least one downwards-extending slant surface. In particular, the bracing elements 136, in particular the maximum longitudinal extension 174 of the bracing elements 136, extend/extends at least largely, in particular at least substantially completely, over the maximum longitudinal extension(s) 170, 162 of the carrier structure 104 and/or of the floating carrier device 100. In particular, for the purpose of supporting the solar elements 10 over a large portion of the maximum longitudinal extension 170, 174 of the carrier structure 104 and/or of the bracing elements 136, in particular over the at least substantially complete maximum longitudinal extension 170, 174 of the carrier structure 104 and/or of the bracing elements 136, the carrier structure 104, in particular the bracing elements 136, is/are configured to receive solar elements 10. Other implementations of the carrier structure 104 are also conceivable, for example with a number of bracing elements 136 differing from four. The bracing elements 136 are preferably each embodied to be hollow and/or they delimit at least one recess, preferentially along their maximum longitudinal extension 174. In particular, the bracing elements 136 are configured for guiding cables to the solar elements 10 and/or away from the solar elements 10, in particular within or in the recess. Preferentially cables of the solar elements 10, of a power converter device 50 and/or of an external unit are arranged at least partially along the maximum longitudinal extension 174 of the bracing elements 136 on and/or within at least one of the bracing elements 136. It is conceivable that the cables are fixated on the bracing element(s) 136 via at least one fixation means, e.g. a clamp, a loop, a screw connection or the like.

FIG. 14 shows a further alternative implementation of a floating carrier device 106. A carrier structure 176 of the floating carrier device 106 is configured to transfer a support force of a power converter device 50 to two floating bodies 102 of the floating carrier device 106. It is also conceivable that the carrier structure 176 is configured to transfer a support force of a functional device that is implemented differently than the power converter device 50 to the floating bodies 102, the functional device being embodied, for example, as a connection hub for a bundling of a plurality of solar devices and/or solar boats, in particular of supply and/or transmission cables of a plurality of solar devices and/or solar boats, and/or being embodied as a monitoring device for a monitoring of solar boats and/or solar devices which are connected with the functional device and/or surround the functional device (see FIG. 1). The floating carrier device 106 illustrated in FIG. 14 has an implementation at least substantially analogous to the floating carrier device 9 described in the description of FIG. 3, and therefore the description of FIG. 3 may be at least substantially referred to as regards an implementation of the floating carrier device 106 shown in FIG. 14. Differently than the floating carrier device 9 described in the description of FIG.

3, the floating carrier device 106 illustrated in FIG. 14 is preferably configured to realize the power converter device 50 in such a way that it is at least substantially completely walkable in a circulating fashion. The floating carrier device 106 comprises six bottom elements 178, which are arranged at least substantially parallel to a maximum longitudinal extension 180 of the floating carrier device 106 and which lie upon the carrier structure 176. In particular, a respective longitudinal axis of the bottom elements 178 is arranged at least substantially parallel to the maximum longitudinal extension 180 of the floating carrier device 106. Respectively three bottom elements 178 of the six bottom elements 178 form a further alleyway 92, which extends at least substantially parallel to a maximum longitudinal extension 180 of the floating carrier device 106. The two further alleyways 92 are respectively arranged on the carrier structure 176 on sides of the power converter device 50 that face away from each other. It is however also conceivable that the floating carrier device 106 comprises a number of bottom elements 178 that differs from six, the bottom elements 178 being in particular arranged at least substantially perpendicularly to the maximum longitudinal extension 180 of the floating carrier device 106. The floating carrier device 106 comprises two cable channel elements 182, which are arranged at least substantially parallel to the bottom elements 178 and/or to the maximum longitudinal extension 180 of the floating carrier device 106. In particular, a respective longitudinal axis of the cable channel elements 182 is arranged at least substantially parallel to the maximum longitudinal extension 180 of the floating carrier device 106 and/or to the bottom elements 178. In particular, the cable channel elements 182 are respectively embodied as an at least substantially panel-shaped bottom element delimiting at least one recess (not shown in the figures) for a guiding of cables. Other implementations of the cable channel elements 182 are also conceivable. In particular, the cable channel elements 182 are embodied, on a respective upper side 184 of the cable channel elements 182, in an anti-skid fashion. Preferentially the cable channel elements 182 are configured for guiding cables of a solar device from at least one solar element 10 to the power converter device 50 and/or from the power converter device 50 to an external unit (not shown in the figures), for example a transformer. The bottom elements 178 and the cable channel elements 182 together form a walkable surface, which is in particular realized at least substantially completely around the power converter device 50. In particular, the power converter device 50 is implemented in such a way that it is completely walkable in a circulating fashion via the bottom elements 178 and the cable channel elements 182. However, other implementations of the floating carrier device 106 are conceivable, for example with a number of cable channel elements 182 that differs from two. The bottom elements 178 and/or the cable channel elements 182 cover the floating bodies 102 of the floating carrier device 106, in particular upper sides of the floating bodies 102 of the floating carrier device 106, at least to a large extent, in particular at least substantially completely. The power converter device 50 is preferentially arranged between the two cable channel elements 182 and/or between the two further alleyways 92. In particular, the two further alleyways 92 have a maximum transverse extension 94 of at least 80 cm, preferably at least 90 cm and preferentially at least 100 cm. Preferably the two further alleyways 92, in particular a maximum longitudinal extension of the two further alleyways 92 on the floating carrier device 106, respectively extend at least substantially completely over a maximum longitudinal extension 180 of the floating carrier device 106. The bottom elements 178 and/or the cable channel elements 182 preferentially lie upon the carrier structure 176, in particular upon carrier elements 186 of the carrier structure 176. Preferably the bottom elements 178 and/or the cable channel elements 182 are fixated on the carrier structure 176, in particular on the carrier elements 186.

Preferentially the bottom elements 178 delimit a plurality of pass-throughs, in particular in a manner distributed over a main extension plane of the bottom elements 178. In a state when the bottom elements 178 are fixated, in particular mounted, on the carrier structure 176, the pass-throughs extend from an upper side of the bottom elements 178 over an entire height of the bottom elements 178 to an underside of the bottom elements 178. The pass-throughs are preferably configured for conveying water from the upper side of the bottom elements 178 through the bottom elements 178 in a perpendicular direction. Preferentially the pass-throughs are configured to at least substantially prevent a retention of water on the bottom elements 178. Preferably the bottom elements 178 are embodied, in particular on an upper side of the bottom elements 178, at least partly in an anti-skid fashion. In a preferred implementation the bottom elements 178 form edgings delimiting the pass-throughs (not shown in the figures), which have an anti-skid effect. For example, the pass-throughs are embodied to be round or angular. Preferentially the pass-throughs and/or the edgings of one bottom element 178 feature several different implementations. The bottom elements 178 are preferably embodied of aluminum or of, in particular furrowed or perforated, sheet metal. However, other implementations of the bottom elements 178 are also conceivable.

The carrier structure 176 comprises two fixation elements 190 for a support of the power converter device 50 and/or of a functional device. The two fixation elements 190 are respectively arranged between the two further alleyways 92 and/or between the two cable channel elements 182, and extend, in particular at least substantially perpendicularly to the ideal water surface 82 and/or to the main extension plane of the floating carrier device 106, from the carrier elements 186 of the carrier structure 176 which support the bottom elements 178 and/or the cable channel elements 182, from below the further alleyways 92 and/or the cable channel elements 182, up to above the further alleyways 92 and/or the cable channel elements 182. In particular, the fixation elements 190 are embodied as hollow profiles. The fixation elements 190 delimit a plurality of openings for a modular fixation of the power converter device 50 and/or of the functional device. However, other implementations of the carrier structure 176, in particular of the fixation elements 190, are also conceivable.

REFERENCE NUMERALS 6 energy conversion system
8 floating carrier device
9 floating carrier device
10 solar element
12 floating body
14 carrier structure
16 side wall
18 side wall
20 receiving region
22 further receiving region
24 upper side
26 stack element
28 stack element 30 crimp profile
32 underside
34 closure element
36 carrier element
38 opening
40 slant surface
42 longitudinal carrier element
44 transverse carrier element
46 air circulation opening
48 floating unit
50 power converter device
52 energy conversion system
54 reference rectangular cuboid
56 envelope
58 reference upper side
60 reference underside
62 reference side face
64 reference side face
66 connection device
68 raft unit
70 damper unit
72 movable connection unit
74 connection element
76 connection element
78 rigid connection unit
80 wave-breaker device
82 water surface
84 anchoring unit
86 longitudinal extension
88 alleyway
90 transverse extension
92 alleyway
94 transverse extension
96 bottom element
98 solar device
100 floating carrier device
102 floating body
104 carrier structure
106 floating carrier device
108 bracing element
110 longitudinal extension
112 transverse extension
114 longitudinal extension
116 stabilization device
118 floating unit
120 distance
122 energy conversion system
124 stabilization element
126 bracing unit
128 bracing element
130 stabilization element
132 force transfer area
134 transverse force transfer area
136 stabilization element
138 distance
140 distance
142 longitudinal extension
144 longitudinal extension
146 main extension axis
148 transverse extension
150 hollow space
152 outer surface
154 wall thickness
156 projection
158 receiving region
160 distance
162 longitudinal extension
164 main extension axis
166 longitudinal extension
168 row
170 longitudinal extension
172 transverse extension
174 longitudinal extension
176 carrier structure
178 bottom element
180 longitudinal extension
182 cable guiding element
184 upper side
186 carrier element
188 upper side
190 fixation means

The invention claimed is:

1. A floating carrier device that is configured to support at least one solar element floating on a water body with at least one floating body and with a carrier structure which is coupled with the floating body and is configured to transfer a support force of the at least one solar element to the at least one floating body, wherein the floating body comprises on at least one side wall a receiving region for the carrier structure, wherein the carrier structure comprises at least two carrier elements which are implemented as longitudinal carrier elements and at least one carrier element which is implemented as a transverse carrier element for a form-fit accommodation of the at least one floating body, wherein the floating body comprises at least on an upper side a recess for receiving the carrier structure, wherein the carrier element embodied as a transverse carrier element is arranged in the recess on the upper side of the floating body in a form-fit fashion and wherein the recess for receiving the carrier structure extends in a transverse direction.

2. The floating carrier device according to claim 1, wherein the floating body comprises at least on an upper side a receiving region for the carrier structure.

3. The floating carrier device according to claim 1, wherein the receiving region is integrally molded with the floating body.

4. The floating carrier device according to claim 1, wherein the receiving region is configured for a form-fit accommodation of the carrier structure.

5. The floating carrier device according to claim 1, wherein the floating body is produced at least substantially via an extrusion blow procedure.

6. The floating carrier device according to claim 1, wherein the floating body comprises at least two stack elements, which are implemented and/or arranged correlating with each other and which are configured to bring at least two floating bodies to a laterally form-fit engagement with each other.

7. The floating carrier device according to claim 6, wherein at least one of the stack elements is implemented as a deepening and the other one of the stack elements is implemented as an elevation that is realized correlating with the deepening.

8. The floating carrier device according to claim 1, wherein the floating body is implemented at least partly with an anti-skid implementation.

9. A floating carrier device that is configured to support at least one solar element floating on a water body-with at least one floating body and with a carrier structure which is coupled with the floating body and is configured to transfer a support force of the at least one solar element to the at least one floating body, wherein in an assembled operation state the floating body at least partly has a decreasing maximum transverse extension perpendicularly to a water surface, along a direction from an upper side to an underside of the floating body.

10. The floating carrier device according to claim 1, wherein at least two side walls of the floating body are embodied at least partially as slant surfaces.

11. The floating carrier device according to claim 1, wherein at least two side walls of the floating body are arranged at least substantially in a wedge shape relative to one another.

12. The floating carrier device according to claim 1, wherein at least one side wall of the floating body comprises at least one crimp profile, which is configured to augment a stability of the floating body.

13. The floating carrier device according to claim 1, wherein the floating body comprises at least on an upper side and/or on an underside at least one crimp profile, which is configured to augment a stability of the floating body.

14. The floating carrier device according to claim 1, wherein the floating body comprises at least one closure element with a pressure compensation unit.

15. The floating carrier device according to claim 1, wherein the carrier structure comprises at least one carrier element that is embodied as a cable guiding unit.

16. The floating carrier device according to claim 1, wherein the carrier structure comprises at least one carrier element that is implemented by a hollow profile.

17. The floating carrier device according to claim 16, wherein the carrier element is implemented at least partially open along a longitudinal axis.

18. The floating carrier device according to claim 16, wherein in an assembled operation state the carrier element comprises at least one opening in a deepest point.

19. The floating carrier device according to claim 16, wherein the carrier element is implemented as a C-profile.

20. The floating carrier device according to claim 16, wherein in an assembled operation state, viewed in a direction from an upper side of the carrier element towards a water surface, the carrier element comprises at least one downward-extending slant surface.

21. The floating carrier device according to claim 1, wherein the carrier structure is configured to receive at least one floating body such that it is supported floating.

22. The floating carrier device according to claim 1, wherein the carrier structure has a maximum longitudinal extension of at least 4 m.

23. The floating carrier device according to claim 1, wherein the carrier structure has a maximum transverse extension of at least 3 m.

24. The floating carrier device according to claim 23, wherein the carrier structure comprises at least one bracing element, which is configured for a support of a plurality of solar elements along a maximum longitudinal extension of the carrier structure, the bracing element having a maximum longitudinal extension of at least 4 m.

25. The floating carrier device according to claim 1, wherein the floating body delimits at least one hollow space having a maximum volume of more than 400 liters.

26. A floating body of a floating carrier device according to claim 1.

27. A carrier structure of a floating carrier device according to claim 1.

28. The carrier structure according to claim 27, comprising a roof structure which is configured to provide assembly surfaces for receiving at least one solar element.

29. A solar device with a floating carrier device according to claim 1 and with at least one solar element.

30. A solar device with
   a floating carrier device configured to support at least one solar element floating on a water body with at least one floating body and with a carrier structure which is coupled with the floating body and is configured to transfer a support force of the at least one solar element to the at least one floating body,
   at least one solar element,
   at least one second solar element, and
   a roof structure, the roof structure being implemented to accommodate the at least two solar elements such that they are directly adjacent to each other, wherein in an assembled operation state the solar elements form an air circulation opening in a highest point.

31. The solar device according to claim 29, comprising a plurality of solar elements, in particular more than twelve solar elements, which, in particular in an arrangement on the floating carrier device, together have a maximum longitudinal extension of at least 4 m.

32. A method for a production of a floating body according to claim 1.

* * * * *